US011866149B2

(12) United States Patent
Scott et al.

(10) Patent No.: US 11,866,149 B2
(45) Date of Patent: Jan. 9, 2024

(54) BLANKETS FOR INSULATING AIRCRAFT STRUCTURES AND INSULATED AIRCRAFT ASSEMBLIES

(71) Applicant: The Boeing Company, Chicago, IL (US)

(72) Inventors: Steven A. Scott, Newcastle, WA (US); John C. Osborne, Bothell, WA (US)

(73) Assignee: THE BOEING COMPANY, Chicago, IL (US)

( * ) Notice: Subject to any disclaimer, the term of this patent is extended or adjusted under 35 U.S.C. 154(b) by 262 days.

(21) Appl. No.: 17/236,924

(22) Filed: Apr. 21, 2021

(65) Prior Publication Data
US 2022/0001972 A1    Jan. 6, 2022

Related U.S. Application Data

(60) Provisional application No. 63/047,671, filed on Jul. 2, 2020.

(51) Int. Cl.
*B64C 1/00* (2006.01)
*B64C 1/40* (2006.01)

(52) U.S. Cl.
CPC .................. *B64C 1/403* (2013.01)

(58) Field of Classification Search
CPC .............. B64C 1/00; B64C 1/40; B64C 1/403
See application file for complete search history.

(56) References Cited

U.S. PATENT DOCUMENTS 5,811,167 A * 9/1998 Norvell .................. B64C 1/066
428/137
6,886,783 B2 * 5/2005 Guard .................. F16L 59/026
244/119

FOREIGN PATENT DOCUMENTS

WO    WO-2006098745 A2 *   9/2006   ........... B29C 44/182

OTHER PUBLICATIONS

Installation of Thermal/Acoustic Insulation for Burnthrough Protection; Advisory Circular, U.S. Department of Transportation, Federal Aviation Administration; Jul. 29, 2008, 35 pgs.

* cited by examiner

*Primary Examiner* — Jacob T Minskey
*Assistant Examiner* — Matthew Hoover
(74) *Attorney, Agent, or Firm* — Kwan & Olynick LLP

(57) ABSTRACT

A blanket for insulating an aircraft structure comprises an insulating portion, comprising a first edge and a second edge, perpendicular to the first edge. The blanket also comprises a tab portion, extending from the insulating portion, and a formable coupler, attached to the insulating portion. The tab portion is thinner than the insulating portion. The insulating portion fully overlaps the formable coupler. The formable coupler is parallel to the second edge of the insulating portion and is perpendicular to the first edge of the insulating portion.

20 Claims, 13 Drawing Sheets

BLANKETS FOR INSULATING AIRCRAFT STRUCTURES AND INSULATED AIRCRAFT ASSEMBLIES

CROSS-REFERENCE TO RELATED APPLICATIONS

This application claims the benefit under 35 U.S.C. § 119(e) of U.S. Provisional Patent Application 63/047,671, filed on 2020 Jul. 2 which is incorporated herein by reference in its entirety for all purposes.

TECHNICAL FIELD

The subject matter, disclosed herein, relates to blankets for insulating aircraft structures and to insulated aircraft assemblies.

BACKGROUND

Conventionally, spring clips are used to attach insulation to aircraft structures. During assembly, insulation is placed over an aircraft structure and spring clips are expanded over the structure, coupling the insulation to the structure via friction. Since a significant amount of force is required to push the spring clips over corresponding portions of the insulation and the aircraft structure, manually installing large numbers of spring clips is difficult and time consuming. Furthermore, spring clips compress portions of the insulation, thus reducing the thickness and, accordingly, the thermal capabilities of the insulation in those regions.

SUMMARY

Accordingly, apparatuses and methods, intended to address at least the above-identified concerns, would find utility.

The following is a non-exhaustive list of examples, which may or may not be claimed, of the subject matter, disclosed herein.

Disclosed herein is a blanket for insulating an aircraft structure. The blanket comprises an insulating portion, comprising a first edge and a second edge, perpendicular to the first edge. The blanket also comprises a tab portion, extending from the insulating portion, and a formable coupler, attached to the insulating portion. The tab portion is thinner than the insulating portion. The insulating portion fully overlaps the formable coupler. The formable coupler is parallel to the second edge of the insulating portion and is perpendicular to the first edge of the insulating portion.

The formable coupler is configured to retain the blanket on the aircraft structure, when the formable coupler is formed around the aircraft structure. This formable feature enables the use of the same type of the formable coupler on different types of structures, e.g., structures having different profiles and/or sizes. Furthermore, this formable feature enables the blanket to be removed and reinstalled, e.g., during aircraft maintenance. The formable coupler can be installed manually without specialized equipment. The force, required to form the formable coupler around the aircraft structure is appreciably smaller than that, required during the installation of conventional retaining clips. Finally, when installed, the formable coupler does not compress the insulating portion, which preserves the thermal insulation properties of the insulating portion in the installation area of the formable coupler.

Also disclosed herein is an insulated aircraft assembly, comprising an aircraft structure, a blanket, and a second blanket. The blanket comprises an insulating portion, a tab portion, extending from the insulating portion, and a formable coupler, attached to the insulating portion. The second blanket comprises a second-blanket insulating portion, a second-blanket tab portion, extending from the second-blanket insulating portion, and a second-blanket formable coupler, attached to the second-blanket insulating portion. The insulating portion of the blanket fully overlaps the formable coupler of the blanket. The tab portion of the blanket is thinner than the insulating portion. The second-blanket insulating portion fully overlaps the second-blanket formable coupler. The second-blanket tab portion is thinner than the second-blanket insulating portion. The formable coupler of the blanket is formed around a portion of the aircraft structure, with a part of the second-blanket tab portion positioned between the formable coupler and the portion of the aircraft structure, so that the formable coupler conforms to the portion of the aircraft structure, coupling the blanket and the second blanket to the aircraft structure.

The formable coupler is configured to retain the blanket and the second blanket on the aircraft structure, when the formable coupler is formed around the aircraft structure. This formable feature enables the use of the same type of the formable coupler on different types of structures, e.g., structures having different profiles and/or sizes. Furthermore, this formable feature enables the blanket and the second blanket to be removed and reinstalled, e.g., during aircraft maintenance. The formable coupler can be installed manually without specialized equipment. The force, required to form the formable coupler around the aircraft structure is appreciably smaller than that, required during installation of conventional retaining clips. The formable coupler is attached to the insulating portion, which provides support to the insulating portion and other parts of the blanket relative to the aircraft structure. Furthermore, a part of the second-blanket tab portion is positioned between the formable coupler and the portion of the aircraft structure, which provides support to the second-blanket tab portion and other parts of the second blanket relative to the aircraft structure. Finally, when installed, the formable coupler does not compress the insulating portion, which preserves the thermal insulation properties of the insulating portion in the installation area of formable coupler.

BRIEF DESCRIPTION OF THE DRAWINGS

Reference will now be made to the accompanying drawings, which are not necessarily drawn to scale, and where like reference characters designate the same or similar parts throughout the several views. In the drawings.

DETAILED DESCRIPTION

Figure 1:
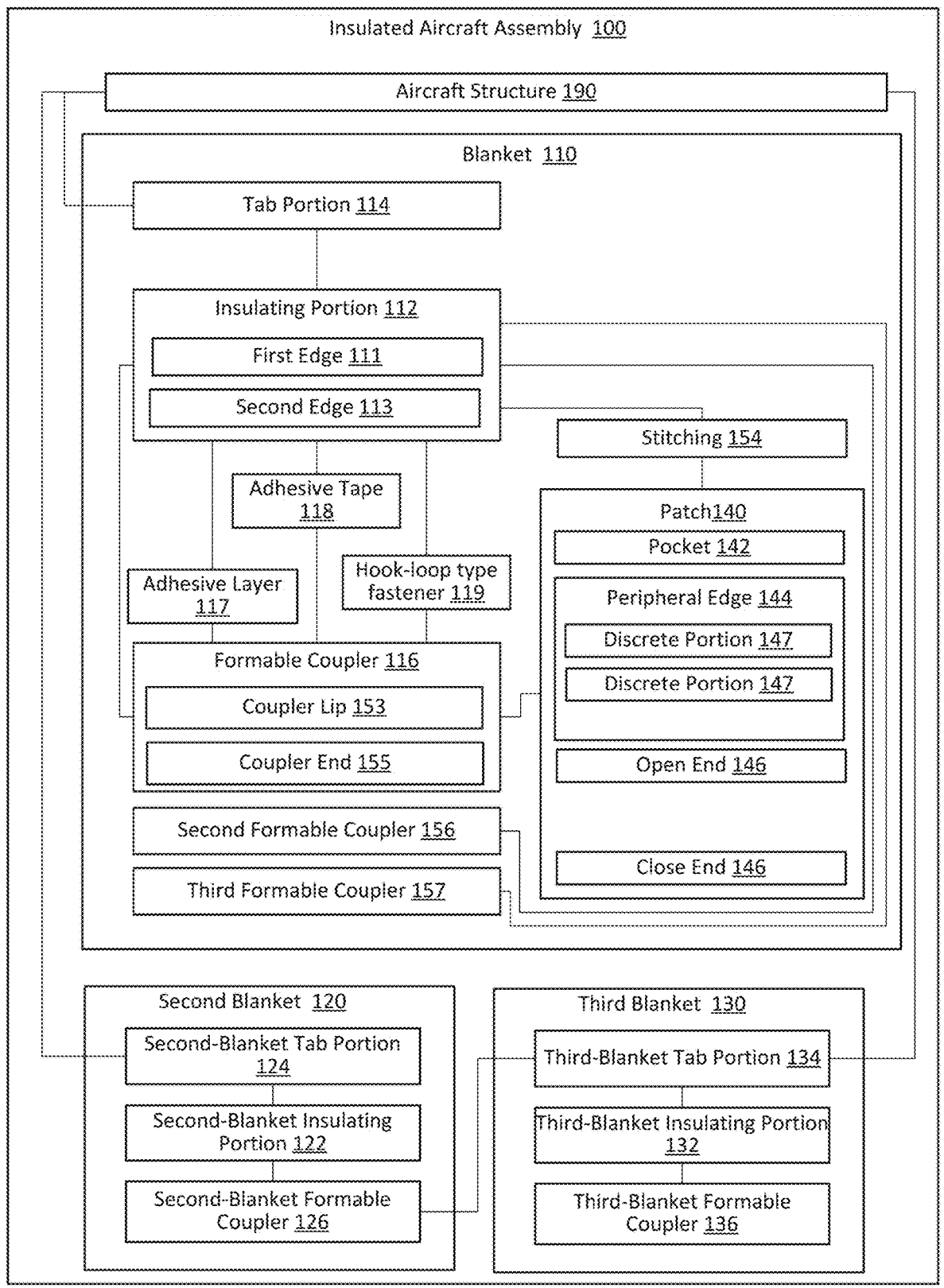
FIG. 1 is a block diagram of an insulated aircraft assembly, comprising an aircraft structure and a blanket, according to one or more examples of the subject matter, disclosed herein.

In FIG. 1, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the subject matter, disclosed herein. Likewise, elements and/or components, if any, represented with dashed lines, indicate alternative examples of the subject matter, disclosed herein. One or more elements shown in solid and/or dashed lines may be omitted from a particular example without departing from the scope of the subject matter, disclosed herein. Environmental elements, if any, are represented with dotted lines. Virtual (imaginary) elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

Figure 5:
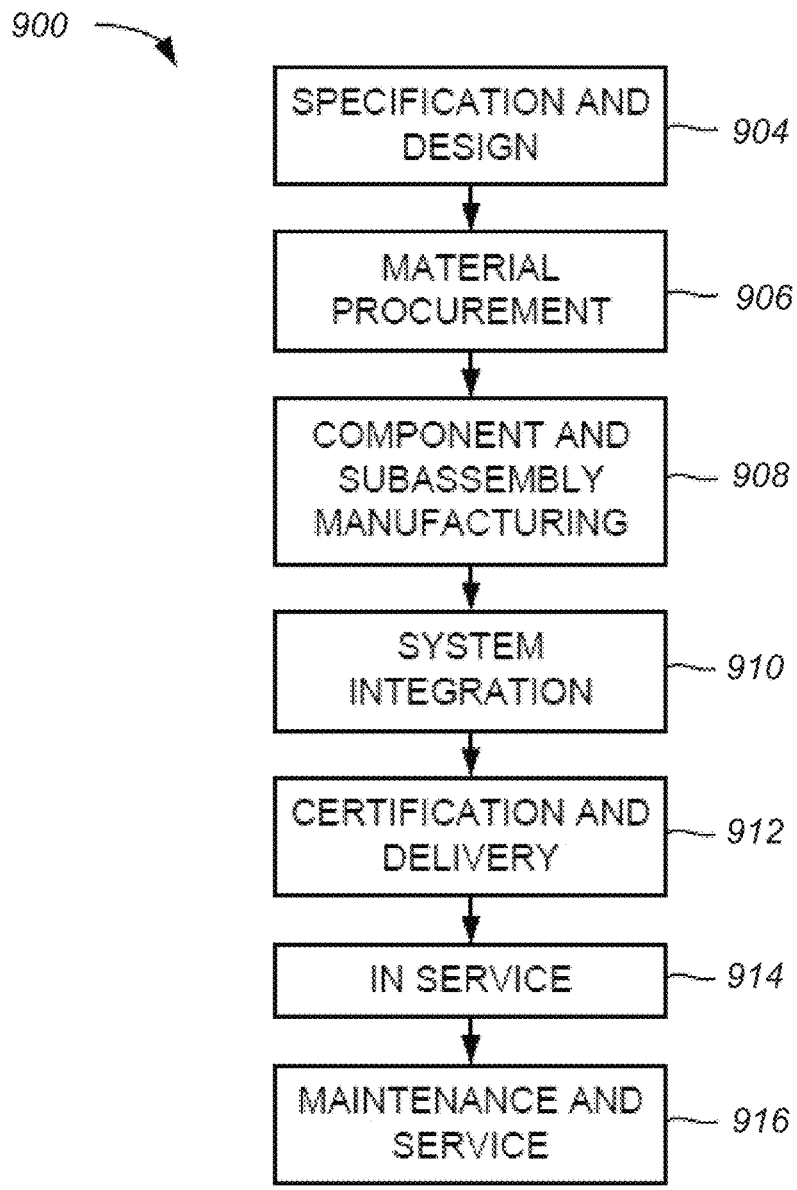
FIG. 5 is a block diagram of aircraft production and service methodology.
Figure 6:
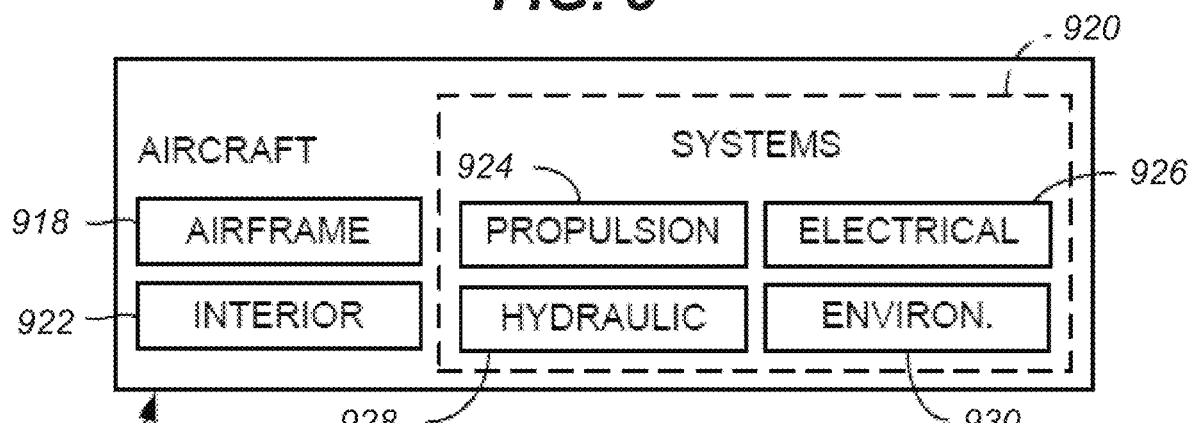
FIG. 6 is a schematic illustration of an aircraft.

In FIGS. 5 and 6, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 5 and 6 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one or more examples" means that one or more feature, structure, or characteristic described in connection with the example is included in at least one implementation. The phrase "one or more examples" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples, which may or may not be claimed, of the subject matter, disclosed herein, are provided below.

Referring generally to FIG. 1 and particularly to, e.g., FIGS. 2A-4E for illustrative purposes only and not by way of limitation, blanket 110 for insulating aircraft structure 190 is disclosed. Blanket 110 comprises insulating portion 112, comprising first edge 111 and second edge 113, perpendicular to first edge 111. Blanket 110 also comprises tab portion 114, extending from insulating portion 112, and formable coupler 116, attached to insulating portion 112. Tab portion 114 is thinner than insulating portion 112. Insulating portion 112 fully overlaps formable coupler 116. Formable coupler 116 is parallel to second edge 113 of insulating portion 112 and is perpendicular to first edge 111 of insulating portion 112. The preceding portion of this paragraph characterizes example 1 of the subject matter, disclosed herein.

Formable coupler 116 is configured to retain blanket 110 on aircraft structure 190, when formable coupler 116 is formed around aircraft structure 190. This formable feature enables the use of the same type of formable coupler 116 on different types of structures, e.g., structures having different profiles and/or sizes. Furthermore, this formable feature enables blanket 110 to be removed and reinstalled, e.g., during aircraft maintenance. Formable coupler 116 can be installed manually without specialized equipment. The force, required to form formable coupler 116 around aircraft structure 190 is appreciably smaller than that, required during installation of conventional retaining clips. Finally, when installed, formable coupler 116 does not compress insulating portion 112, which preserves the thermal insulation properties of insulating portion 112 in the installation area of formable coupler 116.

Figure 4A:
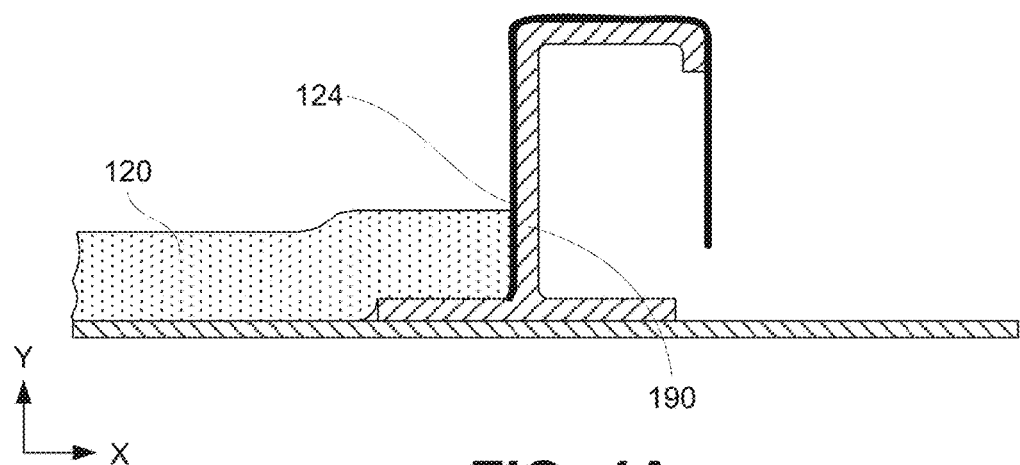
FIGS. 4A-4C are schematic side views of a blanket and a second blanket during installation of the blanket and the second blanket on an aircraft structure and forming the insulated aircraft assembly of FIG. 1, according to one or more examples of the subject matter, disclosed herein.
Figure 4B:
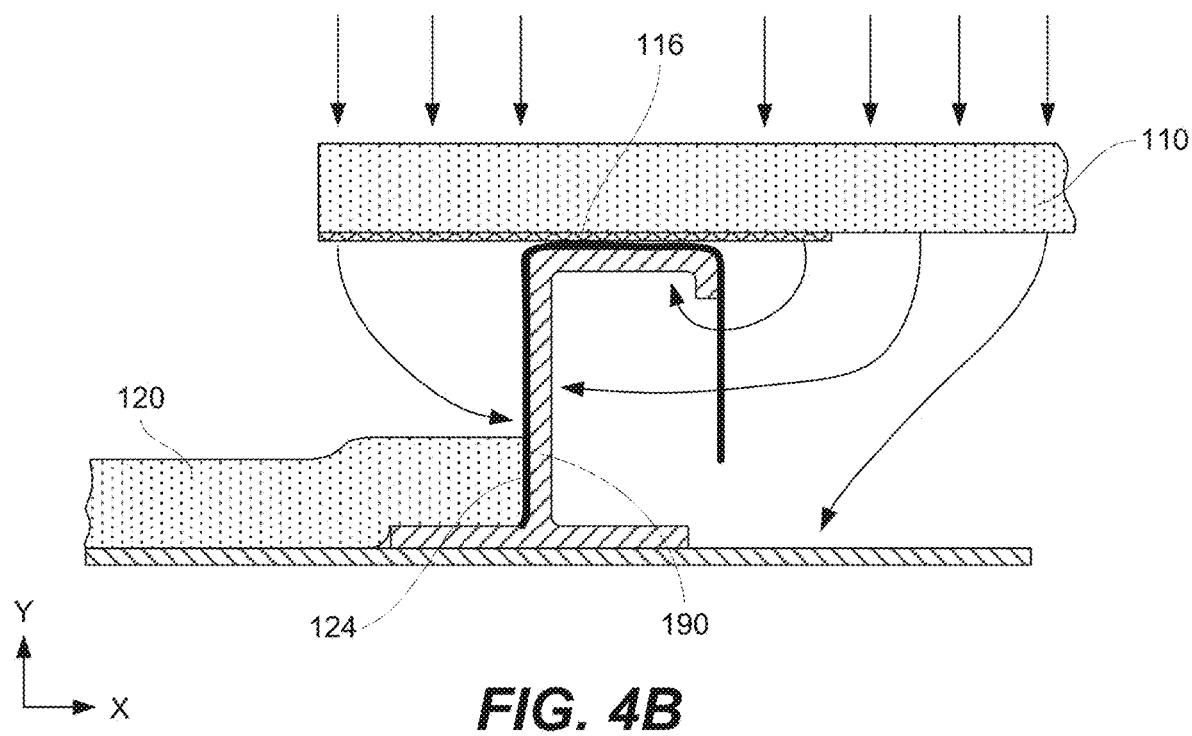
Figure 4C:
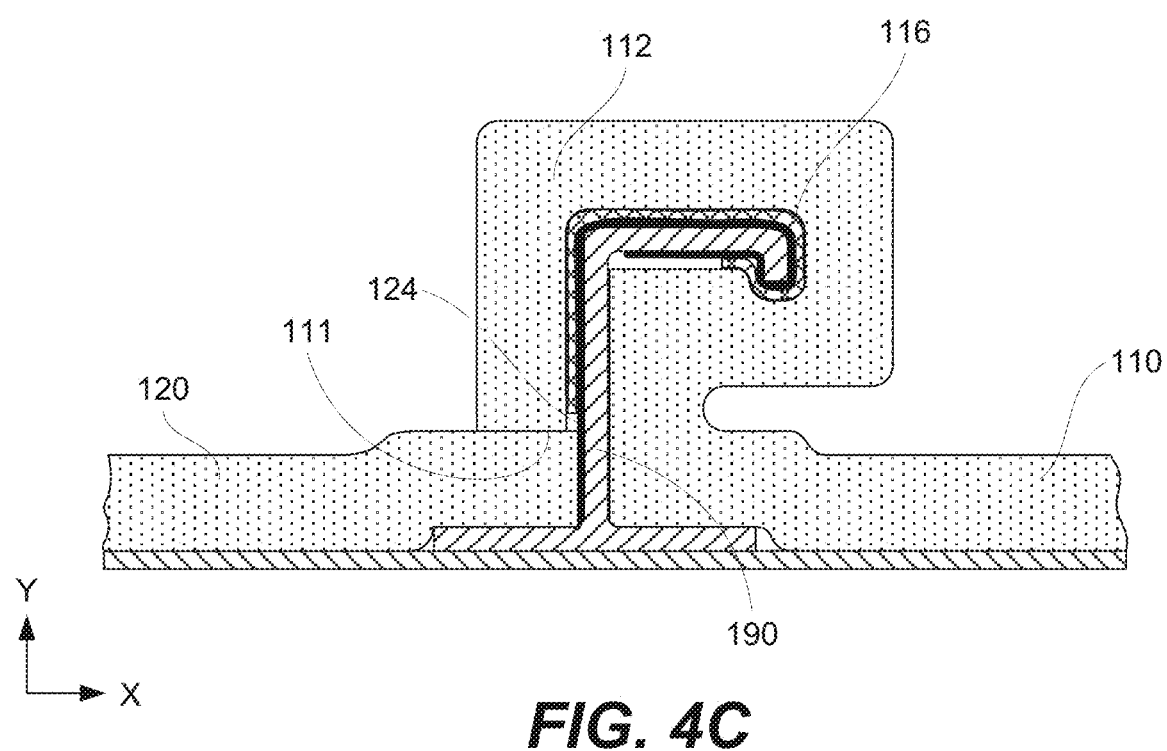

For purposes of this disclosure, forming coupler 116 around aircraft structure 190 is defined as changing the shape of formable coupler 116. For examples, FIGS. 4B and 4C illustrate formable coupler 116 changing the shape from a substantially flat one (FIG. 4B) to the shape, conforming to aircraft structure 190 (FIG. 4C). In this new shape, formable coupler 116 is supported on aircraft structure 190, preventing separation of formable coupler 116 as well as other components of blanket 110 from aircraft structure 190. Furthermore, formable coupler 116 is configured to retain this new shape thereby supporting blanket 110 on aircraft structure 190. This shape is retained until formable coupler 116 is reshaped and, for example, no longer conforms to aircraft structure 190. At this point, formable coupler 116 and the rest of blanket 110 are separable from aircraft structure 190. For example, blanket 110 is removed for servicing the aircraft, installing another blanket, and other like structures.

Figure 2A:
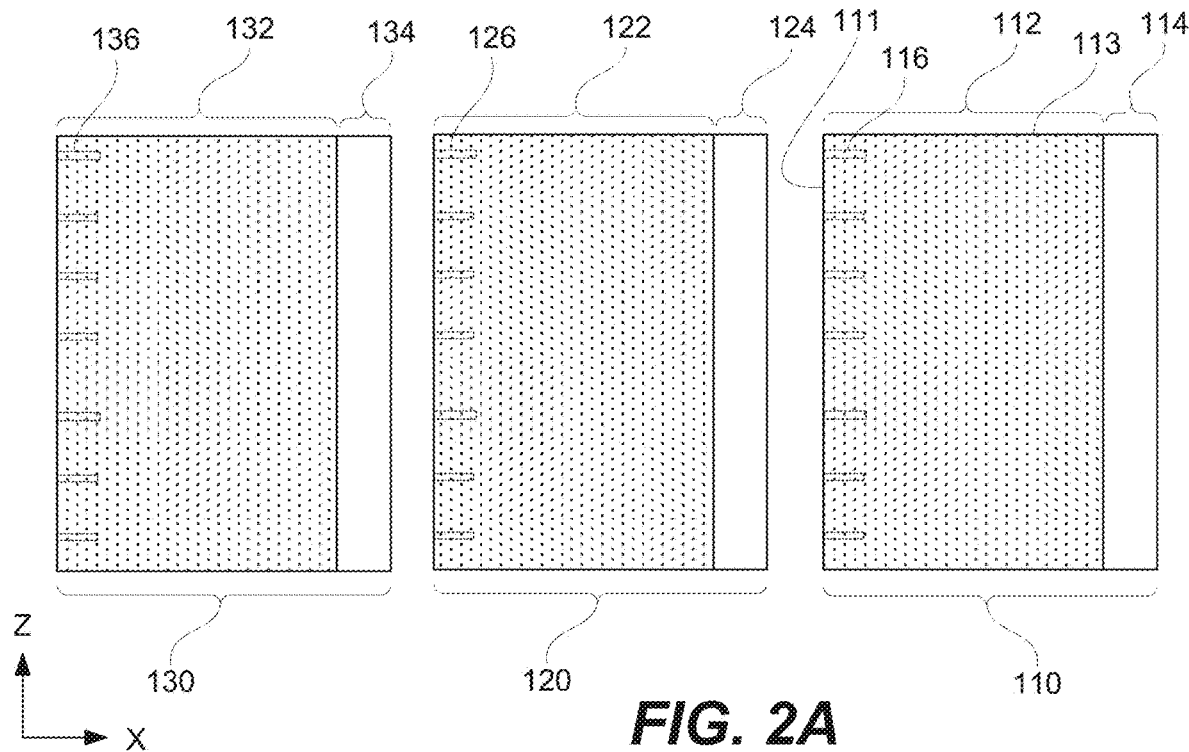
FIG. 2A is a schematic top view of a plurality of blankets for insulating the aircraft structure and forming the insulated aircraft assembly of FIG. 1, according to one or more examples of the subject matter, disclosed herein.
Figure 2B:
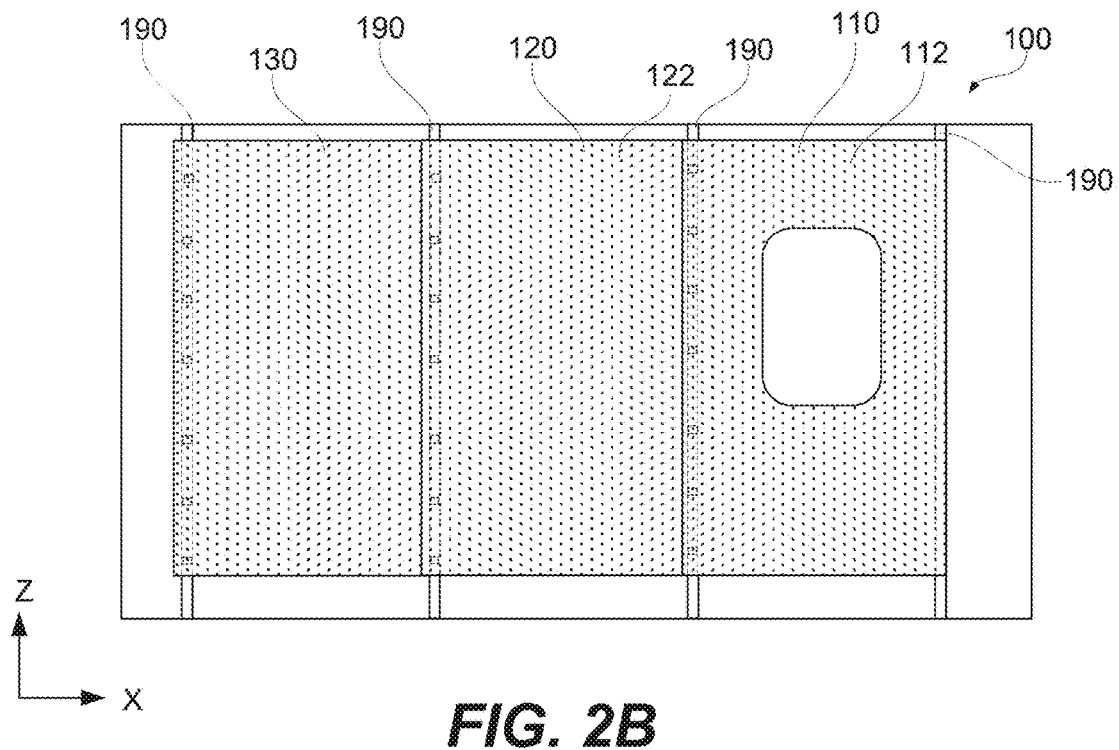
FIG. 2B is a schematic top view of the insulated aircraft assembly of FIG. 1, according to one or more examples of the subject matter, disclosed herein.

Insulating portion 112 provides insulation to any portions of the aircraft, positioned next to insulating portion 112. Referring to FIGS. 2A and 2B, in some examples, insulating portion 112 extends between two adjacent aircraft structures. Furthermore, insulating portion 112 also extends over one of these aircraft structures, such as aircraft structure 190 as shown in FIG. 4C. More specifically, insulating portion 112 conforms and wraps around aircraft structure 190 thereby ensuring thermal insulation around aircraft structure 190. Furthermore, insulating portion 112 fully overlaps formable coupler 116. Therefore, formable coupler 116 and aircraft structure 190, around which formable coupler 116 is formed, are thermally insulated by insulating portion 112.

Tab portion 114 supports blanket 110 when a formable coupler of an adjacent blanket wraps around an adjacent aircraft structure. In this example, tab portion 114 extends between the formable coupler of the adjacent blanket and the adjacent aircraft structure. Furthermore, tab portion 114 is thinner than insulating portion 112 and, unlike insulating portion 112, does not provide thermal insulation to aircraft structure 190. The primary function of tab portion 114 is support of blanket 110.

Figure 2C:
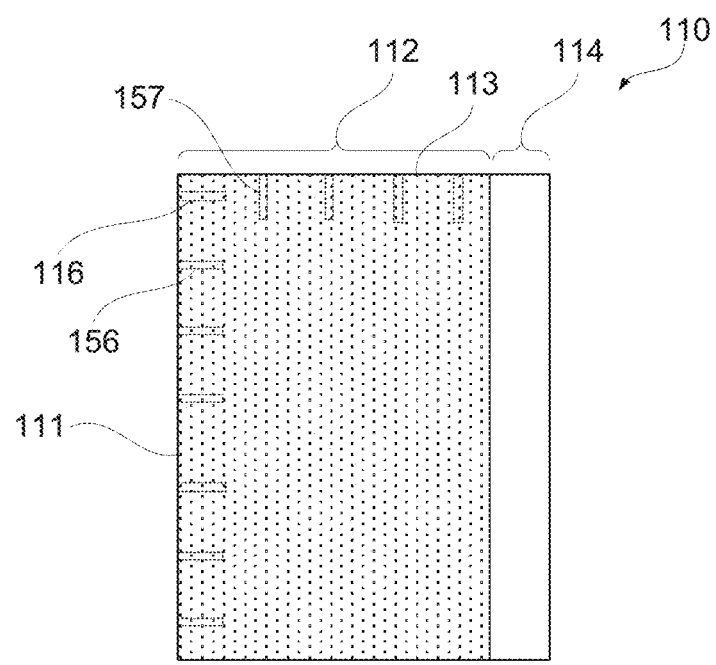
FIG. 2C is a schematic top view of the blanket of FIG. 1, according to one or more examples of the subject matter, disclosed herein.
Figure 2D:
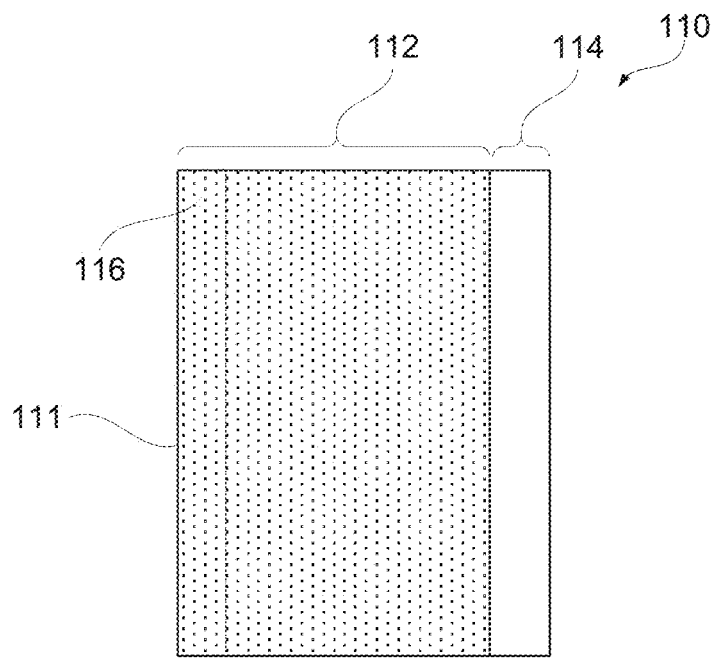
FIG. 2D is a schematic top view of the blanket of FIG. 1, comprising a tab portion, extending along a first edge of an insulating portion, according to one or more examples of the subject matter, disclosed herein.

Referring generally to FIG. 1 and particularly to, e.g., FIG. 2C for illustrative purposes only and not by way of limitation, blanket 110 further comprises second formable coupler 156, attached to insulating portion 112 such that second formable coupler 156 is spaced away from and is parallel to formable coupler 116. The preceding portion of this paragraph characterizes example 2 of the subject matter, disclosed herein, where example 2 also encompasses example 1, above.

A combination of formable coupler 116 and second formable coupler 156 enables distribution of the support load along first edge 111. Furthermore, this combination provides a space between formable coupler 116 and second formable coupler 156, which reduces the overall weight of blanket 110 in comparison, for example, to a continuous formable coupler extending along first edge 111.

In some examples, formable coupler 116 and second formable coupler 156 are two couplers of a larger set of couplers, distributed along first edge 111 as, e.g., is shown in FIG. 2C. For examples, these couplers are evenly distributed along first edge 111. In some examples, formable coupler 116 and second formable coupler 156 have the same or similar features (e.g., the material, geometry). Furthermore, in some examples, formable coupler 116 and second formable coupler 156 have the same spacing relative to first edge 111, e.g., extend to first edge 111 (as shown in FIG. 2C) or are spaced from first edge 111 by the same distance.

Referring generally to FIG. 1 and particularly to, e.g., FIG. 2C for illustrative purposes only and not by way of limitation, blanket 110 further comprises third formable coupler 157, attached to insulating portion 112 such that third formable coupler 157 is spaced away from and is perpendicular to formable coupler 116. The preceding portion of this paragraph characterizes example 3 of the subject matter, disclosed herein, where example 3 also encompasses example 2, above.

Third formable coupler 157 provides support to blanket 110 along a different direction, along second edge 113. For examples, third formable coupler 157 prevents blanket 110 from sliding due to gravity. In some examples, third formable coupler 157 is a part of a larger set of couplers, distributed along second edge 113, as shown in FIG. 2C, for example. In one or more examples, these couplers are evenly distributed along first edge 111. In some examples, formable coupler 116 and third formable coupler 157 have the same or similar features (e.g., the material, geometry).

Figure 3A:
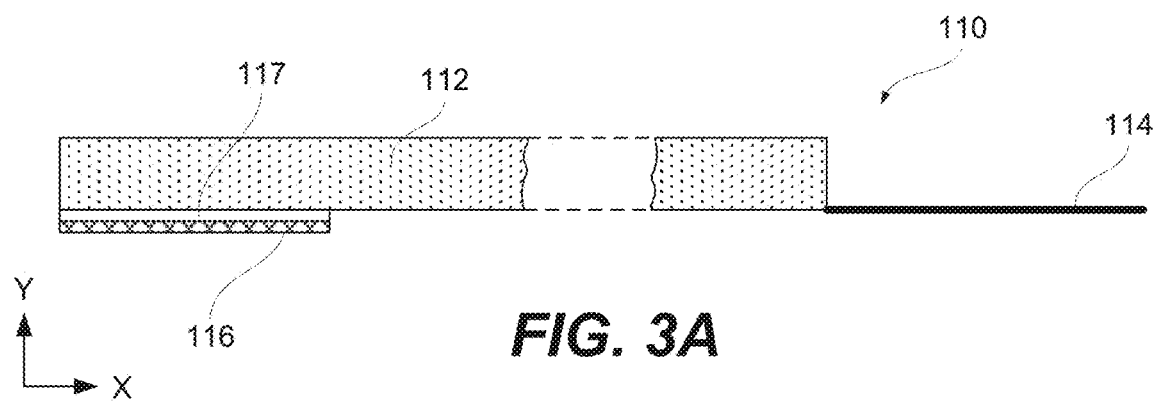
FIG. 3A is a schematic side view of the blanket of FIG. 1, comprising an adhesive layer, located between an insulating portion and a formable coupler, according to one or more examples of the subject matter, disclosed herein.

Referring generally to FIG. 1 and particularly to, e.g., FIG. 3A for illustrative purposes only and not by way of limitation, formable coupler 116 is attached to insulating portion 112 with adhesive layer 117, located between insulating portion 112 and formable coupler 116. The preceding portion of this paragraph characterizes example 4 of the subject matter, disclosed herein, where example 4 also encompasses any one of examples 1 to 3, above.

When adhesive layer 117 is located between insulation portion 112 and formable coupler 116, the same patch of adhesive layer 117 establishes contact with both insulation portion 112 and formable coupler 116. As such, adhesive layer 117 does not need to extend outside the boundary of formable coupler 116 thereby reducing the overall weight of blanket 110 in comparison, e.g., to other larger attachment alternatives.

In some examples, adhesive layer 117 does not extend past the footprint of formable coupler 116. More specifically, the respective footprints of adhesive layer 117 and of formable coupler 116 coincide as is schematically shown, e.g., in FIG. 3A. Alternatively, the footprint of adhesive layer 117 is smaller than that of formable coupler 116. Various examples of adhesive layer 117, such as reactive adhesives (e.g., anaerobic, multi-part, pre-mixed) and non-reactive adhesives (e.g., pressure-sensitive, drying-based, contact-based, melts, and the like), are contemplated herein.

Figure 3B:
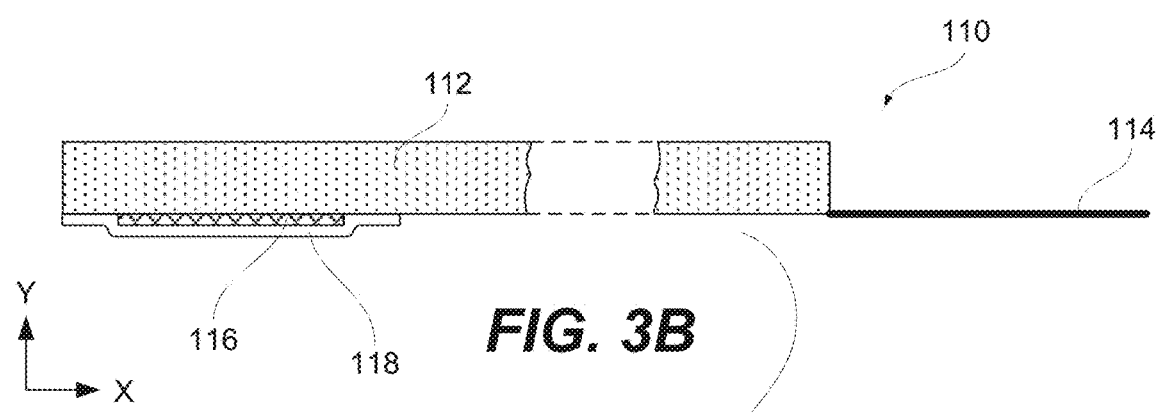
FIG. 3B is a schematic side view of the blanket of FIG. 1, comprising an adhesive tape overlapping at least a portion of a formable coupler and an insulating portion, according to one or more examples of the subject matter, disclosed herein.
Figure 3C:
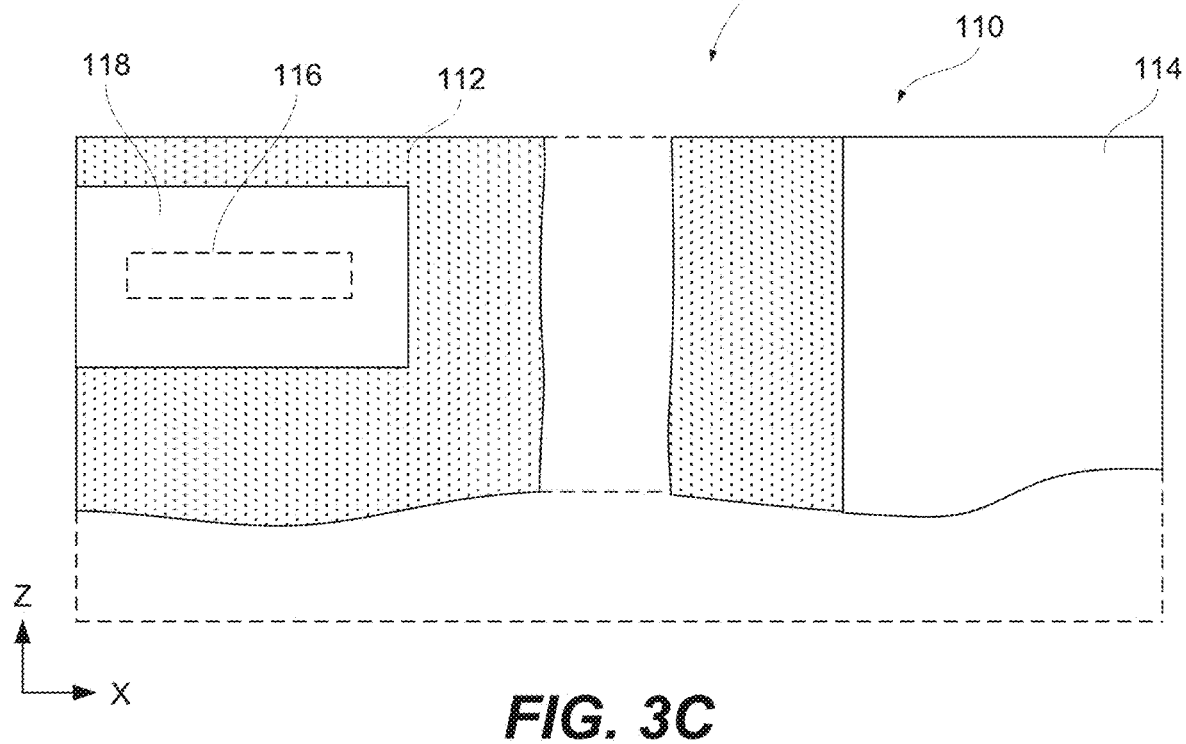
FIG. 3C is a schematic top view of the blanket of FIG. 3B, according to one or more examples of the subject matter, disclosed herein.

Referring generally to FIG. 1 and particularly to, e.g., FIGS. 3B and 3C for illustrative purposes only and not by way of limitation, formable coupler 116 is attached to insulating portion 112 with adhesive tape 118, overlapping at least a portion of formable coupler 116 and a portion of insulating portion 112. The preceding portion of this paragraph characterizes example 5 of the subject matter, disclosed herein, where example 5 also encompasses any one of examples 1 to 3, above.

Adhesive tape 118 separates formable coupler 116 from the environment, e.g., from aircraft structure 190, when formable coupler 116 is formable coupler 116 is formed around aircraft structure 190. In other words, adhesive tape 118 is positioned between formable coupler 116 and aircraft structure 190, after the installation of blanket 110 on aircraft structure 190, and prevents direct contact between formable coupler 116 and aircraft structure 190 (e.g., to prevent corrosion and other damage to aircraft structure 190).

In some examples, adhesive tape 118 comprises a base component (e.g., a polymer film) and an adhesive component, located on at least one side of the base component. The adhesive component of adhesive tape 118 interfaces with insulating portion 112 and, in some examples, formable coupler 116. For example, the adhesive component is a pressure-sensitive adhesive. In some examples, another side of the base component (facing away from insulating portion 112) is free from an adhesive component. Alternatively, an adhesive component is also positioned on this side of base component, e.g., to adhere blanket 110 to aircraft structure 190. This adhesion between blanket 110 to aircraft structure 190 provides additional support to blanket 110 relative to aircraft structure 190, e.g., in addition to support provided by formable coupler 116 around aircraft structure 190.

Referring generally to FIG. 1 and particularly to, e.g., FIGS. 3B and 3C for illustrative purposes only and not by way of limitation, adhesive tape 118 overlaps all of formable coupler 116. The preceding portion of this paragraph characterizes example 6 of the subject matter, disclosed herein, where example 6 also encompasses example 5, above.

When adhesive tape 118 overlaps all of formable coupler 116, adhesive tape 118 provides support to formable coupler 116 around the entire perimeter of formable coupler 116, as shown, e.g., in FIGS. 3B and 3C. The support between adhesive tape 118 and formable coupler 116 effectively supports insulation portion 112 relative to formable coupler 116 and, more specifically, insulation portion 112 relative to aircraft structure 190, when formable coupler 116 is formed around aircraft structure 190. In some examples, adhesive tape 118 extends past all four edges of formable coupler 116 as, e.g., is shown in FIG. 3C. Alternatively, both adhesive tape 118 and formable coupler 116 extend to first edge 111 of insulating portion 112.

Figure 3D:
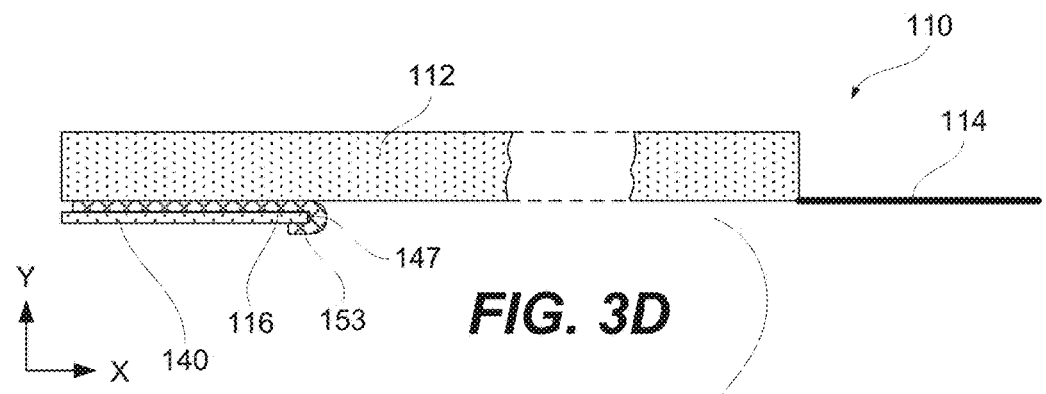
FIG. 3D is a schematic side view of the blanket of FIG. 1, comprising a catch that hooks over a discrete portion of a peripheral edge, according to one or more examples of the subject matter, disclosed herein.
Figure 3E:
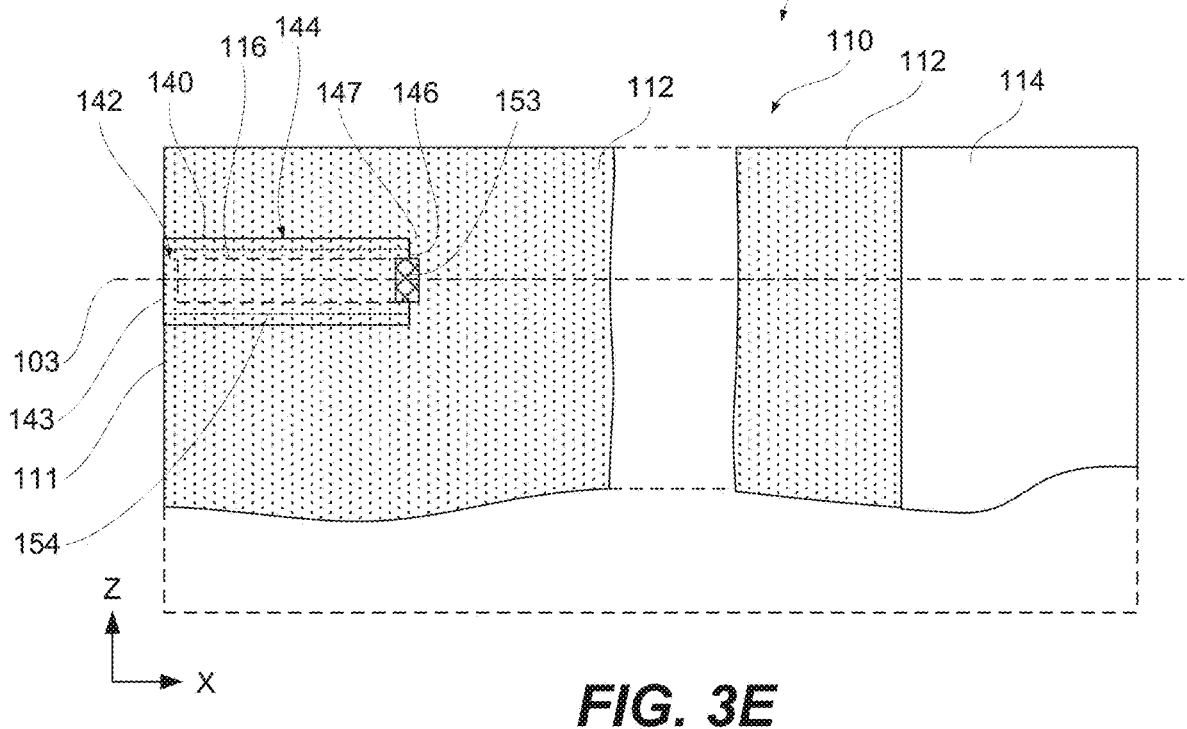
FIG. 3E is a schematic bottom view of the blanket of FIG. 3D, according to one or more examples of the subject matter, disclosed herein.
Figure 3F:
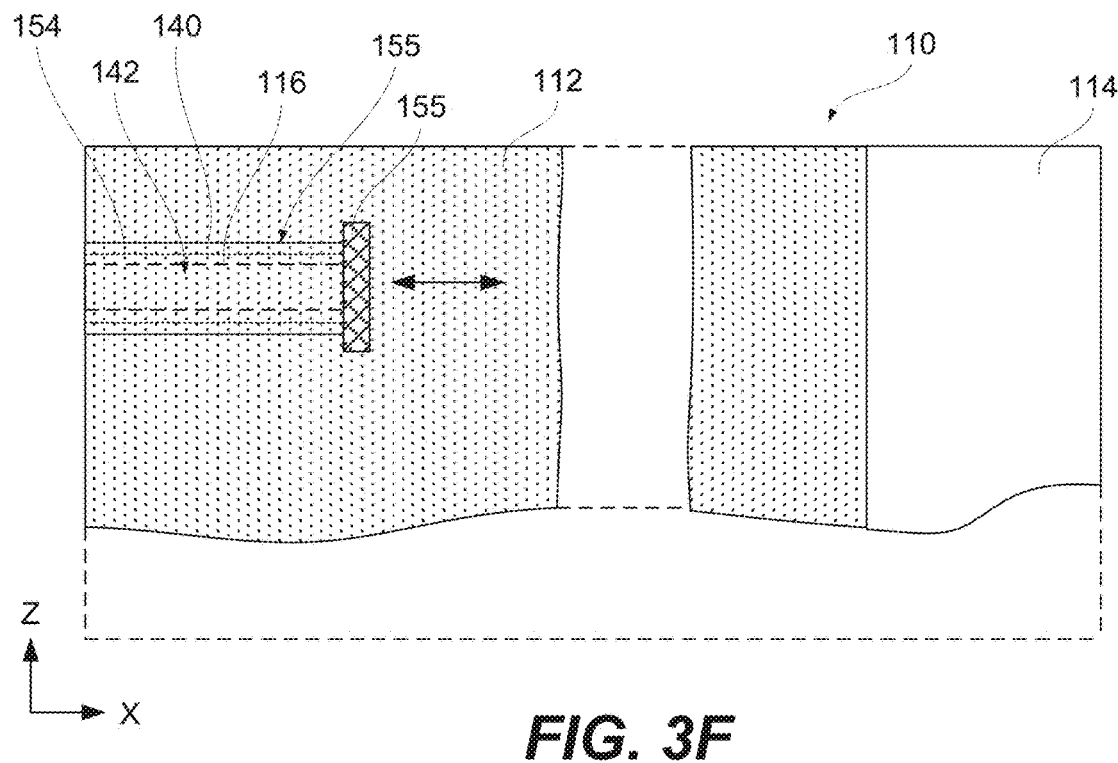
FIG. 3F is a schematic bottom view of the blanket of FIG. 1, comprising a formable coupler with an enlarged portion, according to one or more examples of the subject matter, disclosed herein.
Figure 3G:
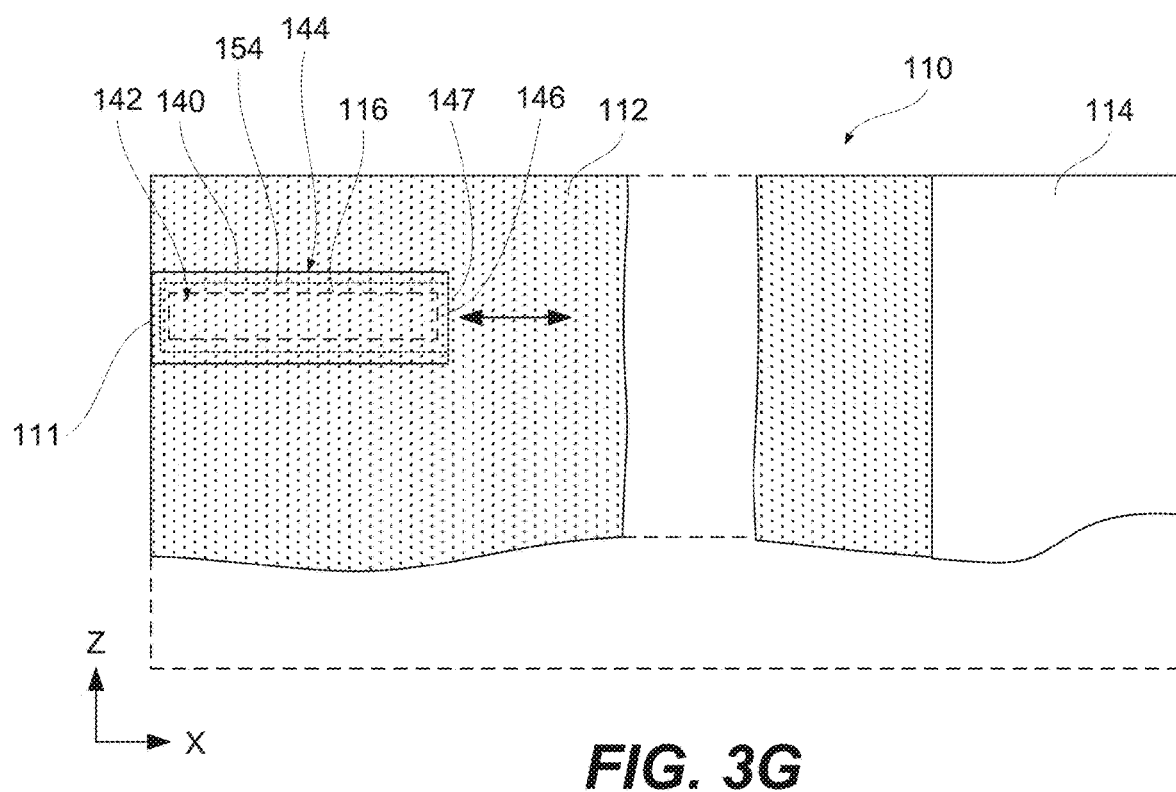
FIG. 3G is a schematic bottom view of the blanket of FIG. 1, comprising a through pocket, enclosing a formable coupler, according to one or more examples of the subject matter, disclosed herein.
Figure 3H:
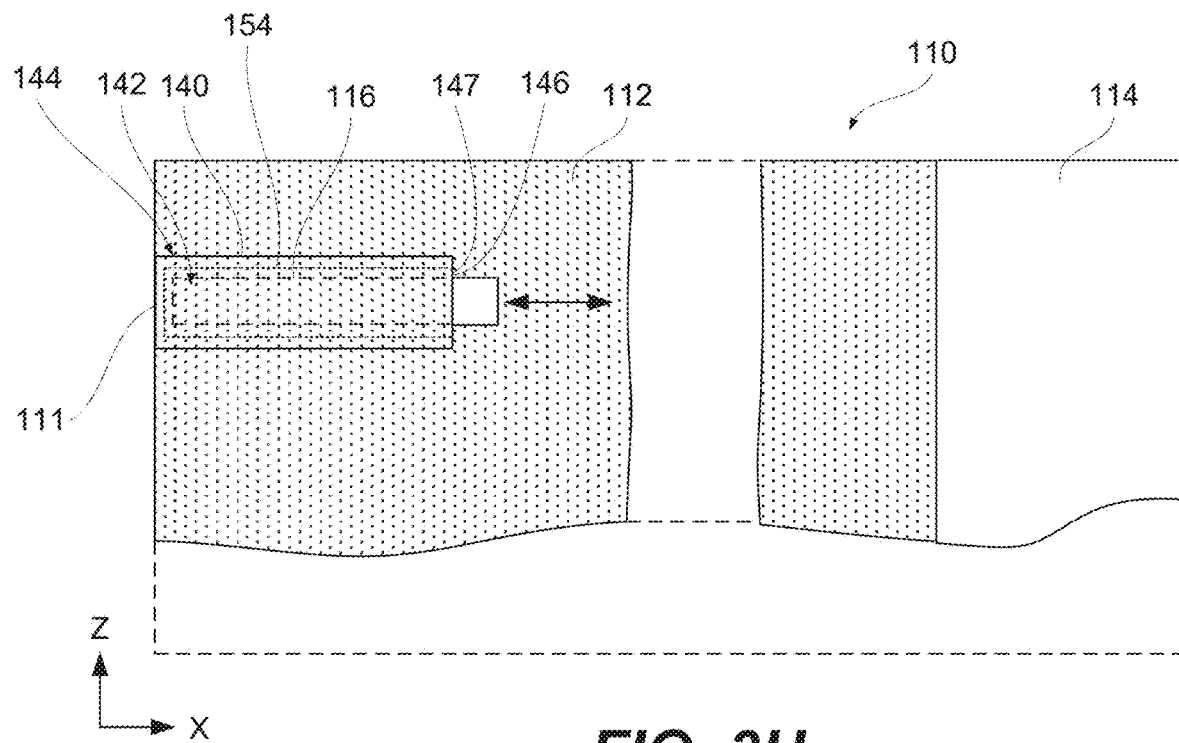
FIG. 3H is a schematic bottom view of the blanket of FIG. 1, showing a formable tab, extending from a pocket in the blanket, according to one or more examples of the subject matter, disclosed herein.
Figure 3I:
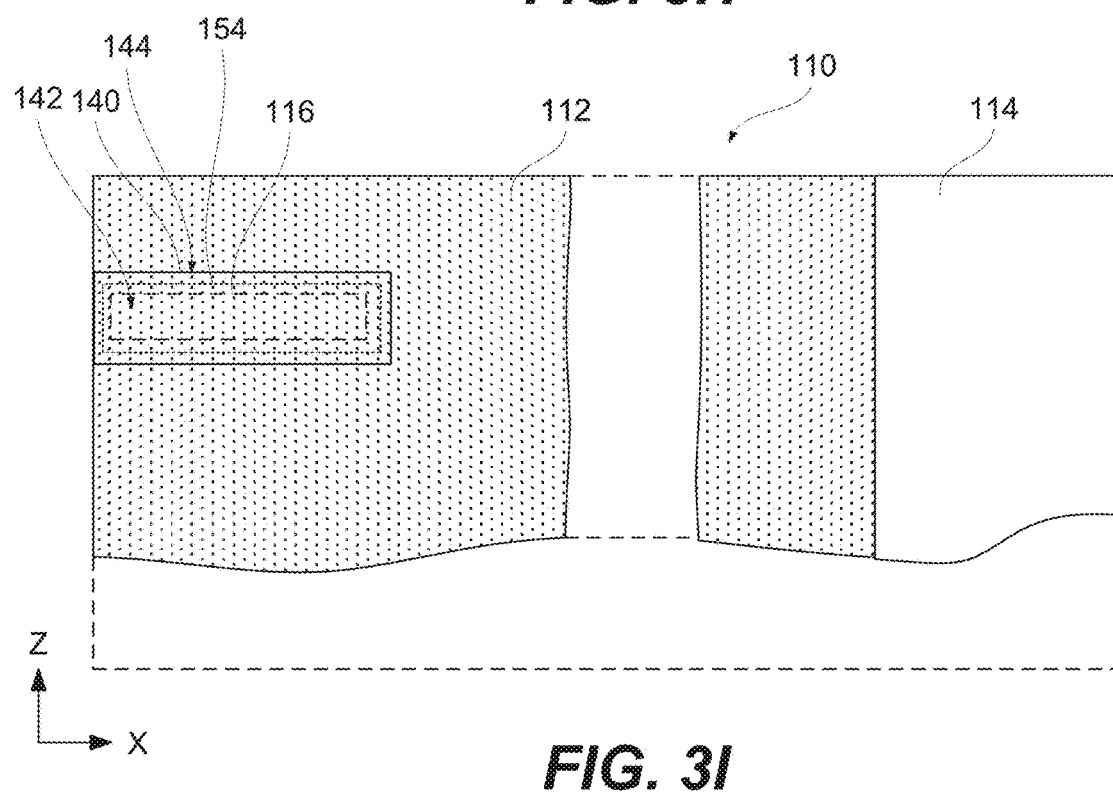
FIG. 3I is a schematic bottom view of the blanket of FIG. 1, comprising a blind pocket that encloses a formable coupler, according to one or more examples of the subject matter, disclosed herein.
Figure 3J:
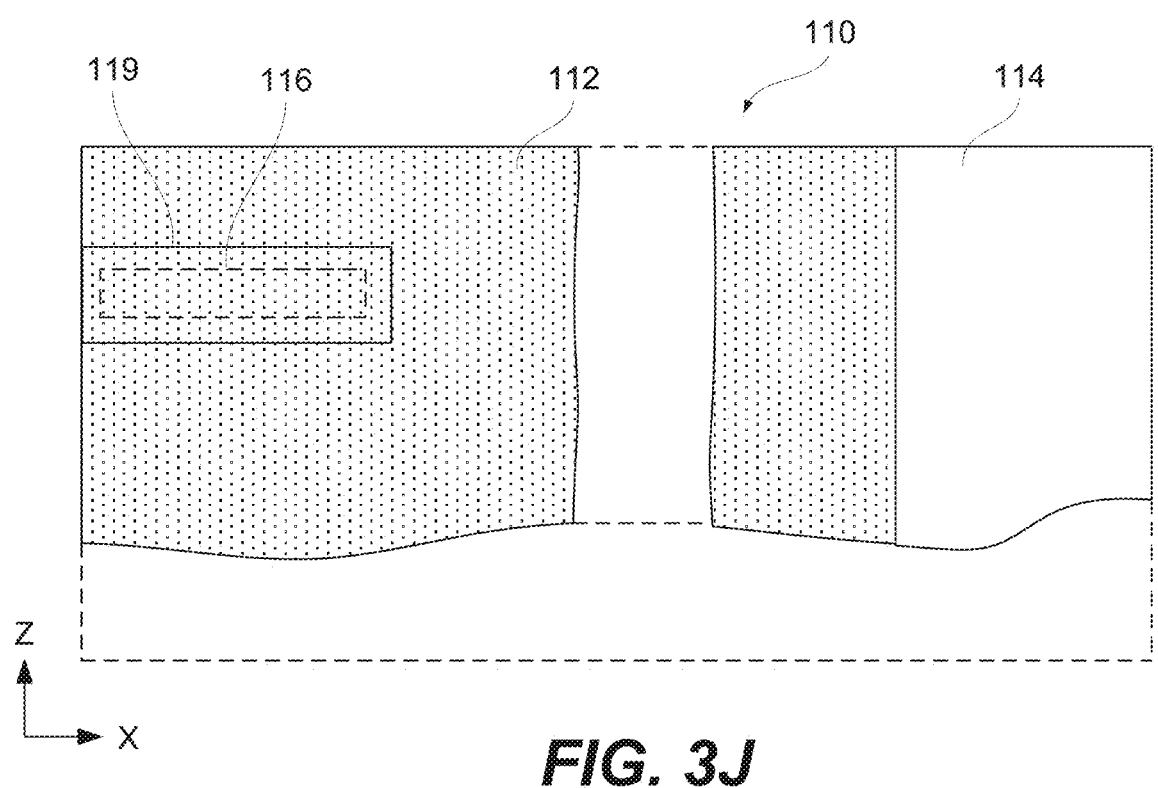
FIG. 3J is a schematic bottom view of the blanket of FIG. 1, comprising a hook- and/or loop-type fastener that attaches a formable tab to an insulating portion of the blanket, according to one or more examples of the subject matter, disclosed herein.

Referring generally to FIG. 1 and particularly to, e.g., FIG. 3J for illustrative purposes only and not by way of limitation, formable coupler 116 is attached to insulating portion 112 with hook- and/or loop-type fastener 119. The preceding portion of this paragraph characterizes example 7 of the subject matter, disclosed herein, where example 7 also encompasses any one of examples 1 to 3, above.

Hook- and/or loop-type fastener 119 provides simple installation on insulating portion 112 and, if needed, removal of formable coupler 116 from insulating portion 112. Specifically, formable coupler 116 is removably attached to insulating portion 112 using hook- and/or loop-type fastener 119. Hook- and/or loop-type fastener 119 utilizes two components, wherein one of the two components comprises miniature flexible hooks, while the other one of the two components comprises miniature flexible loops. When the two components contact each other, the hooks and the loops interlock and the two components releasably fasten or bind together. The two components can be separated by pulling or peeling them apart. In some examples, one of the two components is attached to or integrated into formable coupler 116, while the other one of the two components is attached to, integrated into, or is inherently present in insulating portion 112.

Referring generally to FIG. 1 and particularly to, e.g., FIG. 3J for illustrative purposes only and not by way of limitation, hook- and/or loop-type fastener 119 overlaps at least a portion of formable coupler 116 and a portion of insulating portion 112. The preceding portion of this paragraph characterizes example 8 of the subject matter, disclosed herein, where example 8 also encompasses example 7, above.

The overlap between hook- and/or loop-type fastener 119 and at least the portion of formable coupler 116 is used for attaching hook- and/or loop-type fastener 119 to formable coupler 116. Similarly, the overlap between hook- and/or loop-type fastener 119 and at least the portion of insulating portion 112 is used for attaching hook- and/or loop-type fastener 119 to insulating portion 112.

In some examples, hook- and/or loop-type fastener 119 is positioned between formable coupler 116 and insulating portion 112. One component of hook- and/or loop-type fastener 119 is attached to formable coupler 116, while the other component of hook- and/or loop-type fastener 119 is attached to insulating portion 112. In some examples, these attachments are permanent attachments, such as stitching, gluing, and the like. At the same time, hook- and/or loop-type fastener 119 provides a reversible attachment between formable coupler 116 and insulating portion 112.

Referring generally to FIG. 1 and particularly to, e.g., FIGS. 3B-3J for illustrative purposes only and not by way of limitation, formable coupler 116 is spaced away from first edge 111 of insulating portion 112. The preceding portion of this paragraph characterizes example 9 of the subject matter, disclosed herein, where example 9 also encompasses any one of examples 1 to 8, above.

Positioning formable coupler 116 away from first edge 111 of insulating portion 112 protects formable coupler 116 from the environment. Furthermore, this positioning enables extension of insulating portion 112 past formable coupler 116, e.g., to interface an insulating portion of another blanket thereby ensuring continuous insulation. In some examples, formable coupler 116 is spaced away from first edge 111 of insulating portion 112 by between 1 millimeter and 10 millimeters or, more specifically, by between 3 millimeters and 5 millimeters. It should be noted that this spacing between formable coupler 116 and first edge 111 of insulating portion 112 is not supported by formable coupler 116.

Referring generally to FIG. 1 and particularly to, e.g., FIGS. 3G-3I for illustrative purposes only and not by way of limitation, blanket 110 further comprises patch 140, attached to insulating portion 112 so that pocket 142 is formed between patch 140 and insulating portion 112. Patch 140 comprises peripheral edge 144. The preceding portion of this paragraph characterizes example 10 of the subject matter, disclosed herein, where example 10 also encompasses any one of examples 1 to 3, above.

Patch 140 supports formable coupler 116 relative to insulating portion 112 and, in some examples, enables attachment of formable coupler 116 to insulating portion 112 during installation of blanket 110. For example, blanket 110 includes multiple patches, providing for multiple coupler installation location options. An installer determines where formable couplers are needed and places formable couplers into corresponding pockets.

In some examples, patch 140 is formed from the same material as insulating portion 112 or as tab portion 114. For example, a part of insulating portion 112 is folded over and used as patch 140. Furthermore, various attachments types (of patch 140 to insulating portion 112) are contemplated herein. In some examples, patch 140 is non-removably attached to insulating portion 112.

Referring generally to FIG. 1 and particularly to, e.g., FIGS. 3D-3H for illustrative purposes only and not by way of limitation, patch 140 is attached to insulating portion 112 so that pocket 142 is a blind pocket, having open end 146 that is defined by discrete portion 147 of peripheral edge 144 of patch 140. Discrete portion 147 of peripheral edge 144 is not attached to insulating portion 112. The preceding portion of this paragraph characterizes example 11 of the subject matter, disclosed herein, where example 11 also encompasses example 10, above.

Open end 146 of pocket 142 enables attachment of formable coupler 116 to insulating portion 112 during or prior to installation of blanket 110 on aircraft structure 190. Furthermore, open end 146 of pocket 142 enables detachment of formable coupler 116 from insulating portion 112, e.g., by removing formable coupler 116 from pocket 142. For example, formable coupler 116 is needed in a different location along first edge 111 and needs to be reinstalled.

For purposes of this disclosure, a blind pocket is defined as a pocket with open end 146, while other parts of the pocket are closed. Open end 146 enables installation and removal of formable coupler 116, through open end 146, while other attached parts retain formable coupler 116 within pocket 142.

Referring generally to FIG. 1 and particularly to, e.g., FIGS. 3G-3I for illustrative purposes only and not by way of limitation, open end 146 of pocket 142 faces away from first edge 111 of insulating portion 112. The preceding portion of this paragraph characterizes example 12 of the subject matter, disclosed herein, where example 12 also encompasses example 11, above.

The orientation of open end 146 of pocket 142 indicates the direction for installation of formable coupler 116 to pocket 142 and removal of formable coupler 116 from pocket 142. When open end 146 of pocket 142 faces away from first edge 111 of insulating portion 112, formable coupler 116 is removed from pocket 142 by sliding formable coupler 116, relative to insulating portion 112 and to pocket 142, away from first edge 111. In some examples, after installation of blanket 110 on aircraft structure 190, blanket 110 is at a tension, being pulled in a direction away from first edge 111 and toward open end 146 of pocket 142. It should be noted that formable coupler 116 supports blanket 110 relative to aircraft structure 190, and resists this tension. The orientation of open end 146 of pocket 142 prevents formable coupler 116 from sliding out of pocket 142 when blanket 110 is in tension. In fact, this tension pushes formable coupler 116 deeper into pocket 142.

In some example, open end 146 of pocket 142 or, more specifically, discrete portion 147 of peripheral edge 144 of patch 140, which defines open end 146 of pocket 142, is parallel to first edge 111.

Referring generally to FIG. 1 and particularly to, e.g., FIG. 3G for illustrative purposes only and not by way of limitation, formable coupler 116 is inserted into pocket 142 such that patch 140 overlaps all of formable coupler 116 and formable coupler 116 is spaced away from discrete portion 147 of peripheral edge 144. The preceding portion of this paragraph characterizes example 13 of the subject matter, disclosed herein, where example 13 also encompasses example 11 or 12, above.

Fully inserting formable coupler 116 into pocket 142 helps to isolate formable coupler 116 from the environment, e.g., to prevent moisture condensation on formable coupler 116, corrosion of formable coupler 116, and the like. When formable coupler 116 is inserted into pocket 142 such that patch 140 overlaps all of formable coupler 116 and formable coupler 116 is spaced away from discrete portion 147 of peripheral edge 144, formable coupler 116 is fully inserted into pocket 142. In these examples, formable coupler 116 does not extend out of pocket 142.

Referring generally to FIG. 1 and particularly to, e.g., FIGS. 3E-3I for illustrative purposes only and not by way of limitation, patch 140 is attached to insulating portion 112 with stitching 154. The preceding portion of this paragraph characterizes example 14 of the subject matter, disclosed herein, where example 14 also encompasses any one of examples 10 to 13, above.

Stitching 154 supports patch 140 relative to insulation portion 112 while adding only minimal weight to the overall structure. Unlike surface adhesive, stitching 154 protrudes into the body of patch 140 and the body of insulating portion 112, thereby ensuring robust attachment. Various examples of stitching 154, such as running stitching, basting stitching, cross stitching, backstitching, slip stitching, standard forward/backward stitching, and zigzag stitching, are contemplated herein.

Referring generally to FIG. 1 and particularly to, e.g., FIG. 3I for illustrative purposes only and not by way of limitation, stitching 154 circumferentially encloses formable coupler 116. The preceding portion of this paragraph characterizes example 15 of the subject matter, disclosed herein, where example 15 also encompasses example 14, above.

When stitching 154 circumferentially encloses formable coupler 116, stitching 154 keeps formable coupler inside pocket 142 and prevents sliding from pocket 142 when, e.g., blanket 110 is placed under tension during installation of blanket 110. This circumferentially enclosing feature also ensures that formable coupler 116 does not accidently slips out of pocket 142 during transportation, handling, and installation of blanket 110.

In some examples, stitching 154, which circumferentially encloses formable coupler 116, is formed during fabrication of blanket 110. As such, formable coupler 116 is permanently fixed on blanket 110 during this process.

Referring generally to FIG. 1 and particularly to, e.g., FIGS. 3E-3H for illustrative purposes only and not by way of limitation, patch 140 is attached to insulating portion 112 with stitching 154 that is not circumferentially closed. The preceding portion of this paragraph characterizes example 16 of the subject matter, disclosed herein, where example 16 also encompasses example 14, above.

Stitching 154 that is not circumferentially closed enables attachment of formable coupler 116 to insulating portion 112 during or prior to installation of blanket 110 on aircraft structure 190. Furthermore, stitching 154 that is not circumferentially closed enables detachment of formable coupler 116 from insulating portion 112, e.g., by removing formable coupler 116 from pocket 142. For example, formable coupler 116 is needed in a different location along first edge 111 and needs to be reinstalled.

In some examples, stitching 154, which is not circumferentially closed, creates open end 146, which is defined by discrete portion 147 of peripheral edge 144 of patch 140. Discrete portion 147 of peripheral edge 144 is not attached to insulating portion 112.

Referring generally to FIG. 1 and particularly to, e.g., FIG. 3E for illustrative purposes only and not by way of limitation, peripheral edge 144 of patch 140 comprises discrete portion 147. Pocket 142 is a through pocket, comprising open end 146, defined by discrete portion 147, which is not attached to insulating portion 112. Pocket 142 also comprises second open end 143, which is not attached to insulating portion 112 and is offset, relative to open end 146, along line 103, perpendicular to first edge 111 of insulating portion 112, to open end 146, and to second open end 143. Second open end 143 of pocket 142 is closer to first edge 111 of insulating portion 112 than open end 146. The preceding portion of this paragraph characterizes example 17 of the subject matter, disclosed herein, where example 17 also encompasses example 10, above.

A through pocket enables attachment of formable coupler 116 to insulating portion 112 during or prior to installation of blanket 110 on aircraft structure 190. Furthermore, the through pocket enables detachment of formable coupler 116 from insulating portion 112, e.g., by removing formable coupler 116 from pocket 142. For example, formable coupler 116 is needed in a different location along first edge 111 and needs to be reinstalled. This installation and removal can be performed from different ends of pocket 142, e.g., open end 146 and second open end 143.

In some examples, a though pocket is formed by attaching two portions of peripheral edge 144, extending between two non-attached discrete portions.

Referring generally to FIG. 1 and particularly to, e.g., FIGS. 3D-3F for illustrative purposes only and not by way of limitation, formable coupler 116 extends out of pocket 142 from open end 146 of pocket 142. The preceding portion of this paragraph characterizes example 18 of the subject matter, disclosed herein, where example 18 also encompasses example 17, above.

When formable coupler 116 extends out of pocket 142, formable coupler 116 can be easily removed (e.g., pulled) from pocket 142. For example, an installer decides that formable coupler 116 is not needed at a particular location. In some examples, formable coupler 116 extends out of pocket 142 by at least 1 millimeter or, more specifically, at least 3 millimeters.

Figure 4D:
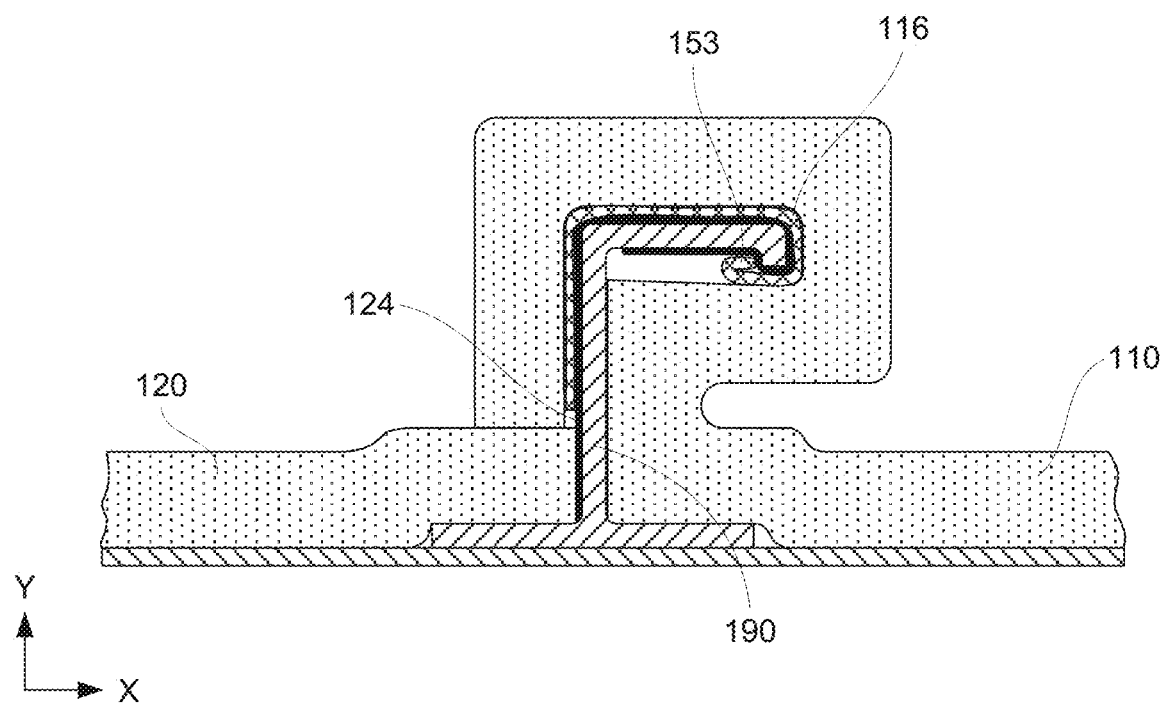
FIG. 4D is a schematic side view of a blanket and a second blanket after installation of the blanket and the second blanket on an aircraft structure and forming the insulated aircraft assembly of FIG. 1, according to one or more examples of the subject matter, disclosed herein.

Referring generally to FIG. 1 and particularly to, e.g., FIGS. 3D, 3E and 4D for illustrative purposes only and not by way of limitation, one end of formable coupler 116 comprises catch 153 that hooks over discrete portion 147 of peripheral edge 144. The preceding portion of this paragraph characterizes example 19 of the subject matter, disclosed herein, where example 19 also encompasses example 17 or 18, above.

Catch 153 keeps formable coupler 116 in pocket 142 and prevents formable coupler 116 from sliding out of pocket 142 when, e.g., blanket 110 is placed under tension during installation of blanket 110. Furthermore, in some examples, catch 153 is configured to engage a part of aircraft structure 190 as, e.g., is shown in FIG. 4D thereby providing additional support to blanket 110 on aircraft structure 190.

In some examples, catch 153 is formed by folding over a part of formable coupler 116 over discrete portion 147 of peripheral edge 144, e.g., using stamping or other suitable process. In some examples, the size of catch 153 is between 0.5 millimeters and 5 millimeters or, more specifically, between 1 millimeter and 3 millimeters.

Referring generally to FIG. 1 and particularly to, e.g., FIG. 3F for illustrative purposes only and not by way of limitation, one end of formable coupler 116 comprises enlarged portion 155, which is wider than open end 146 of pocket 142. The preceding portion of this paragraph characterizes example 20 of the subject matter, disclosed herein, where example 20 also encompasses example 17 or 18, above.

Enlarged portion 155 keeps formable coupler 116 in pocket 142 and prevents formable coupler 116 from sliding out of pocket 142 when, e.g., blanket 110 is placed under tension during installation of blanket 110. More specifically, enlarged portion 155 is wider than pocket 142. In some examples, enlarged portion 155 is at least 10% or even at least 20% wider than the remaining portion of formable coupler 116. It should be noted that this remaining portion of formable coupler 116 is narrower than pocket 142 and extends into pocket 142.

Referring generally to FIG. 1 and particularly to, e.g., FIGS. 3D-3F for illustrative purposes only and not by way of limitation, a portion of formable coupler 116 extends from pocket 142. The preceding portion of this paragraph characterizes example 21 of the subject matter, disclosed herein, where example 21 also encompasses any one of examples 10 to 14, 16, and 17, above.

When formable coupler 116 extends out of pocket 142, formable coupler 116 can be easily removed (e.g., pulled)

from pocket 142. For example, an installer decides that formable coupler 116 is not needed at a particular location. In some examples, formable coupler 116 extends out of pocket 142 by at least 1 millimeter or, more specifically, at least 3 millimeters.

Referring generally to FIG. 1 and particularly to, e.g., FIGS. 2A-4E for illustrative purposes only and not by way of limitation, insulated aircraft assembly 100 is disclosed. Insulated aircraft assembly 100 comprises aircraft structure 190, blanket 110, and second blanket 120. Blanket 110 comprises insulating portion 112, tab portion 114, extending from insulating portion 112, and formable coupler 116, attached to insulating portion 112. Second blanket 120 comprises second-blanket insulating portion 122, second-blanket tab portion 124, extending from second-blanket insulating portion 122, and second-blanket formable coupler 126, attached to second-blanket insulating portion 122. Insulating portion 112 of blanket 110 fully overlaps formable coupler 116 of blanket 110. Tab portion 114 of blanket 110 is thinner than insulating portion 112. Second-blanket insulating portion 122 fully overlaps second-blanket formable coupler 126. Second-blanket tab portion 124 is thinner than second-blanket insulating portion 122. Formable coupler 116 of blanket 110 is formed around a portion of aircraft structure 190, with a part of second-blanket tab portion 124 positioned between formable coupler 116 and the portion of aircraft structure 190, so that formable coupler 116 conforms to the portion of aircraft structure 190, coupling blanket 110 and second blanket 120 to aircraft structure 190. The preceding portion of this paragraph characterizes example 22 of the subject matter, disclosed herein.

Formable coupler 116 is configured to retain blanket 110 and second blanket 120 on aircraft structure 190, when formable coupler 116 is formed around aircraft structure 190. This formable feature enables the same type of formable coupler 116 to be used on different types of structures, e.g., structures having different profiles and/or sizes. Furthermore, this formable feature enables blanket 110 and second blanket 120 to be removed and reinstalled, e.g., during aircraft maintenance. Formable coupler 116 can be installed manually without specialized equipment. The force, required to form coupler 116 around aircraft structure 190 is appreciably smaller than that, required during installation of conventional retaining clips. Formable coupler 116 is attached to insulating portion 112, which provides support to insulating portion 112 and other parts of blanket 110 relative to aircraft structure 190. Furthermore, a part of second-blanket tab portion 124 is positioned between formable coupler 116 and the portion of aircraft structure 190, which provides support to second-blanket tab portion 124 and other parts of second blanket 120 relative to aircraft structure 190. Finally, when installed, formable coupler 116 does not compress insulating portion 112, which preserves the thermal insulation properties of insulating portion 112 in the installation area of formable coupler 116.

For purposes of this disclosure, forming coupler 116 around aircraft structure 190 is defined as changing the shape of formable coupler 116. For examples, FIGS. 4B and 4C illustrate formable coupler 116 changing the shape from a substantially flat one (FIG. 4B) to the shape, conforming to aircraft structure 190 (FIG. 4C). In this new shape, formable coupler 116 is supported on aircraft structure 190, preventing separation of formable coupler 116 as well as other components of blanket 110 from aircraft structure 190. Furthermore, formable coupler 116 is configured to retain this new shape thereby supporting blanket 110 on aircraft structure 190 after the installation. This shape is retained until formable coupler 116 is reshaped and, for example, no longer conforms to aircraft structure 190. At this point, formable coupler 116 and the rest of blanket 110, as well as second blanket 120, are separable from aircraft structure 190. For example, blanket 110 and/or second blanket 120 is removed for servicing the aircraft, installing another blanket, and other like structures.

Figure 4E:
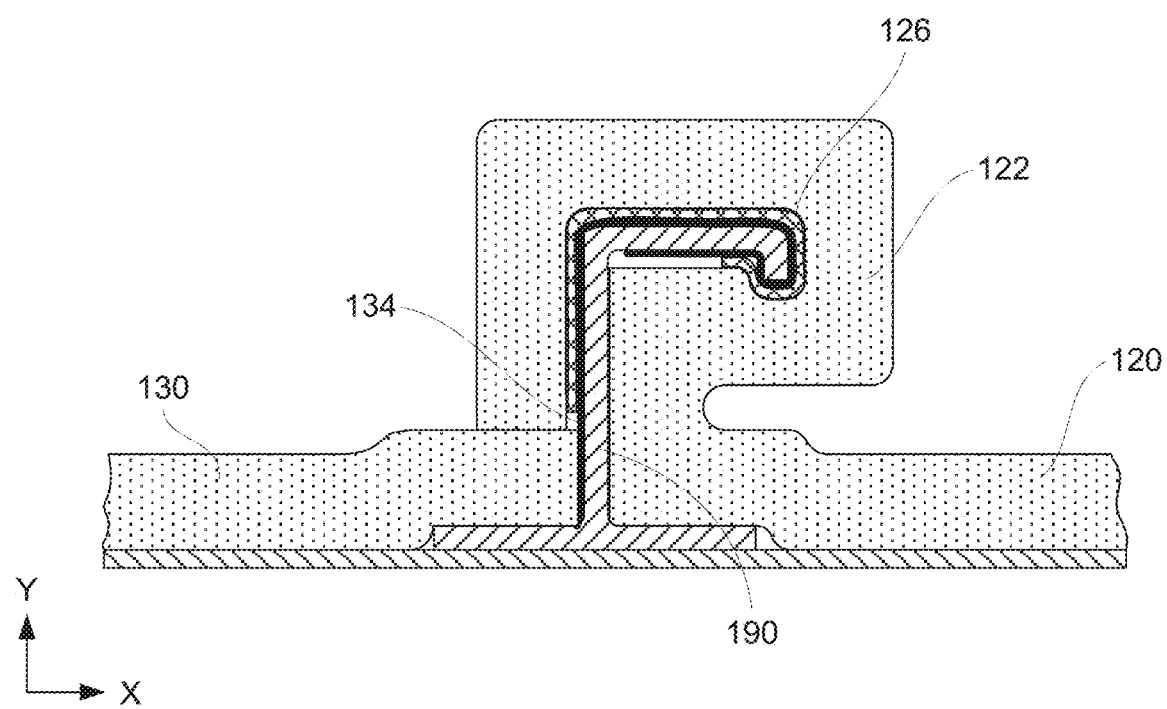
FIG. 4E is a schematic side view of a second blanket and a third blanket after installation of the blanket and the second blanket on an aircraft structure and forming the insulated aircraft assembly of FIG. 1, according to one or more examples of the subject matter, disclosed herein.

Insulating portion 112 and second-blanket insulating portion 122 provide insulation to any portions of the aircraft, positioned next to insulating portion 112 and second-blanket insulating portion 122. Referring to FIGS. 2A and 2B, in some examples, insulating portion 112 extends between two adjacent aircraft structures. Likewise, second-blanket insulating portion 122 extends between two other adjacent aircraft structures. Furthermore, insulating portion 112 also extends over one of these aircraft structures, such as aircraft structure 190 as shown in FIG. 4C. Likewise, second-blanket insulating portion 122 also extends over one of these aircraft structures, such as aircraft structure 190 as shown in FIG. 4E. More specifically, each of insulating portion 112 and second-blanket insulating portion 122 conforms and wraps around a corresponding aircraft structure, thereby ensuring the thermal insulation of this aircraft structure and around this aircraft structure. Furthermore, insulating portion 112 fully overlaps formable coupler 116. Therefore, formable coupler 116 and aircraft structure 190, around which formable coupler 116 is formed, are thermally insulated by insulating portion 112. Likewise, second-blanket insulating portion 122 fully overlaps second-blanket formable coupler 126.

Tab portion 114 supports blanket 110 when a formable coupler of an adjacent blanket wraps around an aircraft structure. In this example, tab portion 114 extends between the formable coupler of the adjacent blanket and the adjacent aircraft structure. Furthermore, tab portion 114 is thinner than insulating portion 112 and, unlike insulating portion 112, does not provide thermal insulation to aircraft structure 190. The primary function of tab portion 114 is support of blanket 110.

Likewise, second-blanket tab portion 124 supports second blanket 120 when formable coupler 116 of blanket 110 is formed around aircraft structure 190. In this example, second-blanket tab portion 124 extends between formable coupler 116 and aircraft structure 190 as, e.g., is shown in FIG. 4C or FIG. 4D. Furthermore, second-blanket tab portion 124 is thinner than second-blanket insulating portion 122 and, unlike second-blanket insulating portion 122, does not provide thermal insulation to aircraft structure 190. The primary function of second-blanket tab portion 124 is support of second blanket 120.

Referring generally to FIG. 1 and particularly to, e.g., FIGS. 2A and 4E for illustrative purposes only and not by way of limitation, insulated aircraft assembly 100 further comprises third blanket 130, comprising third-blanket insulating portion 132, third-blanket tab portion 134, extending from third-blanket insulating portion 132, and third-blanket formable coupler 136, attached to third-blanket insulating portion 132. Third-blanket insulating portion 132 fully overlaps third-blanket formable coupler 136. Third-blanket tab portion 134 is thinner than third-blanket insulating portion 132. Second-blanket formable coupler 126 is formed around second portion of aircraft structure 190, with a part of third-blanket tab portion 134 positioned between second-blanket formable coupler 126 and a second portion of aircraft structure 190, so that second-blanket formable coupler 126 conforms to the second portion of aircraft structure 190, coupling second blanket 120 and third blanket 130 to aircraft structure 190. The preceding portion of this paragraph characterizes example 23 of the subject matter, disclosed herein, where example 23 also encompasses example 22, above.

Second-blanket formable coupler 126 is configured to retain second blanket 120 and third blanket 130 on an aircraft structure, when second-blanket formable coupler 126 is formed around that aircraft structure. This formable feature enables the same type of second-blanket formable coupler 126 and third-blanket formable coupler 136 to be used on different types of structures, e.g., structures having different profiles and/or sizes. Furthermore, this formable feature enables second blanket 120 and third blanket 130 to be removed and reinstalled, e.g., during aircraft maintenance. Second-blanket formable coupler 126 and/or third-blanket formable coupler 136 can be installed manually without specialized equipment. The force, required to form second-blanket formable coupler 126 and/or third-blanket formable coupler 136 around a corresponding aircraft structure is appreciably smaller than that, required during installation of conventional retaining clips. Third-blanket formable coupler 136 is attached to third-blanket insulating portion 132, which provides support to third-blanket insulating portion 132 and other parts of third blanket 130 relative to a corresponding aircraft structure. Furthermore, a part of third-blanket tab portion 134 is positioned between second-blanket formable coupler 126 and the portion of an aircraft structure, which provides support to third-blanket tab portion 134 and other parts of third blanket 130 relative to this aircraft structure.

For purposes of this disclosure, forming third-blanket formable coupler 136 around aircraft structure 190 is defined as changing the shape of third-blanket formable coupler 136. In this new shape, third-blanket formable coupler 136 is supported on aircraft structure 190, preventing separation of third-blanket formable coupler 136 as well as other components of blanket 110 from aircraft structure 190. Furthermore, third-blanket formable coupler 136 is configured to retain this new shape thereby supporting third blanket 130 on aircraft structure 190 after the installation. This shape is retained until third-blanket formable coupler 136 is reshaped and, for example, no longer conforms to aircraft structure 190. At this point, third-blanket formable coupler 136 and the rest of third blanket 130.

Third-blanket insulating portion 132 provides insulation to any portions of the aircraft, positioned next to third-blanket insulating portion 132. Referring to FIGS. 2A and 2B, in some examples, third-blanket insulating portion 132 extends between two adjacent aircraft structures. Furthermore, third-blanket insulating portion 132 also extends over one of these aircraft structures. Finally, third-blanket insulating portion 132 fully overlaps third-blanket formable coupler 136. Therefore, third-blanket formable coupler 136 and aircraft structure 190, around which third-blanket formable coupler 136 is formed, are thermally insulated by third-blanket insulating portion 132.

Third-blanket tab portion 134 supports third blanket 130 when second-blanket formable coupler 126 of second blanket 120 is formed around aircraft structure 190 as, e.g., is shown in FIG. 4E. In this example, third-blanket tab portion 134 extends between second-blanket formable coupler 126 and aircraft structure 190. Furthermore, third-blanket tab portion 134 is thinner than third-blanket insulating portion 132 and, unlike third-blanket insulating portion 132, does not provide thermal insulation to aircraft structure 190. The primary function of third-blanket tab portion 134 is support of second blanket 120.

Referring generally to FIG. 1 and particularly to, e.g., FIG. 2C for illustrative purposes only and not by way of limitation, insulated aircraft assembly 100 further comprises second formable coupler 156, attached to insulating portion 112 such that second formable coupler 156 is spaced away from and is parallel to formable coupler 116. The preceding portion of this paragraph characterizes example 24 of the subject matter, disclosed herein, where example 24 also encompasses example 22 or 23, above.

A combination of formable coupler 116 and second formable coupler 156 enables the support load to be distributed along first edge 111. Furthermore, this combination provides a space between formable coupler 116 and second formable coupler 156, which reduces the overall weight of blanket 110 in comparison, for example, to a continuous formable coupler, extending along first edge 111.

In some examples, formable coupler 116 and second formable coupler 156 are two couplers of a larger set of couplers, distributed along first edge 111 as, e.g., is shown in FIG. 2C. For examples, these couplers are evenly distributed along first edge 111. In some examples, formable coupler 116 and second formable coupler 156 have the same or similar features (e.g., the material, geometry). Furthermore, in some examples, formable coupler 116 and second formable coupler 156 have the same spacing relative to first edge 111, e.g., extend to first edge 111 (as shown in FIG. 2C) or are spaced from first edge 111 by the same distance.

Referring generally to FIG. 1 and particularly to, e.g., FIG. 2C for illustrative purposes only and not by way of limitation, insulated aircraft assembly 100 further comprises third formable coupler 157, attached to insulating portion 112 such that third formable coupler 157 is spaced away from and is perpendicular to formable coupler 116. The preceding portion of this paragraph characterizes example 25 of the subject matter, disclosed herein, where example 25 also encompasses example 24, above.

Third formable coupler 157 provides support to blanket 110 along a different direction, along second edge 113. For examples, third formable coupler 157 prevents blanket 110 from sliding due to gravity. In some examples, third formable coupler 157 is a part of a larger set of couplers, distributed along second edge 113, as shown in FIG. 2C, for example. In one or more examples, these couplers are evenly distributed along first edge 111. In some examples, formable coupler 116 and third formable coupler 157 have the same or similar features (e.g., the material, geometry).

Referring generally to FIG. 1 and particularly to, e.g., FIG. 3A for illustrative purposes only and not by way of limitation, formable coupler 116 is attached to insulating portion 112 with adhesive layer 117, located between insulating portion 112 and formable coupler 116. The preceding portion of this paragraph characterizes example 26 of the subject matter, disclosed herein, where example 26 also encompasses any one of examples 22 to 25, above.

When adhesive layer 117 is located between insulation portion 112 and formable coupler 116, the same patch of adhesive layer 117 establishes contact with both insulation portion 112 and formable coupler 116. As such, adhesive layer 117 does not need to extend outside the boundary of formable coupler 116, thereby reducing the overall weight of blanket 110 in comparison, e.g., to other larger attachment alternatives.

In some examples, adhesive layer 117 does not extend past the footprint of formable coupler 116. More specifically, the respective footprints of adhesive layer 117 and of formable coupler 116 coincide as, e.g., is schematically shown in FIG. 3A. Alternatively, the footprint of adhesive layer 117 is smaller than that of formable coupler 116. Various examples of adhesive layer 117, such as reactive adhesives (e.g., anaerobic, multi-part, pre-mixed) and non-reactive adhesives (e.g., pressure-sensitive, drying-based, contact-based, melts, and the like), are contemplated herein.

Referring generally to FIG. 1 and particularly to, e.g., FIGS. 3B and 3C for illustrative purposes only and not by way of limitation, formable coupler 116 is attached to insulating portion 112 with adhesive tape 118, overlapping at least a portion of formable coupler 116 and a portion of insulating portion 112. The preceding portion of this paragraph characterizes example 27 of the subject matter, disclosed herein, where example 27 also encompasses any one of examples 22 to 25, above.

Adhesive tape 118 separates formable coupler 116 from the environment, e.g., from aircraft structure 190, when formable coupler 116 is formable coupler 116 is formed around aircraft structure 190. In other words, adhesive tape 118 is positioned between formable coupler 116 and aircraft structure 190, after the installation of blanket 110 on aircraft structure 190, and prevents direct contact between formable coupler 116 and aircraft structure 190 (e.g., to prevent corrosion and other damage to aircraft structure 190).

In some examples, adhesive tape 118 comprises a base component (e.g., a polymer film) and an adhesive component, located on at least one side of the base component. The adhesive component of adhesive tape 118 interfaces with insulating portion 112 and, in some examples, formable coupler 116. For example, the adhesive component is a pressure-sensitive adhesive. In some examples, another side of the base component (facing away from insulating portion 112) is free from an adhesive component. Alternatively, an adhesive component is also positioned on this side of base component, e.g., to adhere blanket 110 to aircraft structure 190. This adhesion between blanket 110 to aircraft structure 190 provides additional support to blanket 110 relative to aircraft structure 190, e.g., in addition to support provided by formable coupler 116 around aircraft structure 190.

Referring generally to FIG. 1 and particularly to, e.g., FIGS. 3B and 3C for illustrative purposes only and not by way of limitation, adhesive tape 118 overlaps all of formable coupler 116. The preceding portion of this paragraph characterizes example 28 of the subject matter, disclosed herein, where example 28 also encompasses example 27, above.

When adhesive tape 118 overlaps all of formable coupler 116, adhesive tape 118 provides support to formable coupler 116 around the entire perimeter of formable coupler 116 as, e.g., is shown in FIGS. 3B and 3C. The support between adhesive tape 118 and formable coupler 116 effectively supports insulation portion 112 relative to formable coupler 116 and, more specifically, insulation portion 112 relative to aircraft structure 190, when formable coupler 116 is formed around aircraft structure 190. In some examples, adhesive tape 118 extends past all four edges of formable coupler 116 as, e.g., is shown in FIG. 3C. Alternatively, both adhesive tape 118 and formable coupler 116 extend to first edge 111 of insulating portion 112.

Referring generally to FIG. 1 and particularly to, e.g., FIG. 3.1 for illustrative purposes only and not by way of limitation, formable coupler 116 is attached to insulating portion 112 with hook- and/or loop-type fastener 119. The preceding portion of this paragraph characterizes example 29 of the subject matter, disclosed herein, where example 29 also encompasses any one of examples 22 to 25, above.

Hook- and/or loop-type fastener 119 provides simple installation on insulating portion 112 and, if needed, removal of formable coupler 116 from insulating portion 112. Specifically, formable coupler 116 is removably attached to insulating portion 112 using hook- and/or loop-type fastener 119. Hook- and/or loop-type fastener 119 utilizes two components, wherein one of the two components comprises miniature flexible hooks, while the other one of the two components comprises miniature flexible loops. When the two components contact each other, the hooks and the loops interlock and the two components releasably fasten or bind together. The two components can be separated by pulling or peeling them apart. In some examples, one of the two components is attached to or integrated into formable coupler 116, while the other one of the two components is attached to, integrated into, or is inherently present in insulating portion 112.

Referring generally to FIG. 1 and particularly to, e.g., FIG. 3J for illustrative purposes only and not by way of limitation, hook- and/or loop-type fastener 119 overlaps at least a portion of formable coupler 116 and a portion of insulating portion 112. The preceding portion of this paragraph characterizes example 30 of the subject matter, disclosed herein, where example 30 also encompasses example 29, above.

Referring generally to FIG. 1 and particularly to, e.g., FIGS. 3B-3J for illustrative purposes only and not by way of limitation, insulating portion 112 comprises first edge 111 and second edge 113, perpendicular to first edge 111. Formable coupler 116 is spaced away from first edge 111 of insulating portion 112. The preceding portion of this paragraph characterizes example 31 of the subject matter, disclosed herein, where example 31 also encompasses any one of examples 22 to 30, above.

The overlap between hook- and/or loop-type fastener 119 and at least the portion of formable coupler 116 is used for attaching hook- and/or loop-type fastener 119 to formable coupler 116. Similarly, the overlap between hook- and/or loop-type fastener 119 and at least the portion of insulating portion 112 is used for attaching hook- and/or loop-type fastener 119 to insulating portion 112.

In some examples, hook- and/or loop-type fastener 119 is positioned between formable coupler 116 and insulating portion 112. One component of hook- and/or loop-type fastener 119 is attached to formable coupler 116, while the other component of hook- and/or loop-type fastener 119 is attached to insulating portion 112. In some examples, these attachments are permanent attachments, such as stitching, gluing, and the like. At the same time, hook- and/or loop-type fastener 119 provides a removable attachment between formable coupler 116 and insulating portion 112.

Referring generally to FIG. 1 and particularly to, e.g., FIGS. 3G-3I for illustrative purposes only and not by way of limitation, insulated aircraft assembly 100 further comprises patch 140, attached to insulating portion 112 so that pocket 142 is formed between patch 140 and insulating portion 112, wherein patch 140 comprises peripheral edge 144. The preceding portion of this paragraph characterizes example 32 of the subject matter, disclosed herein, where example 32 also encompasses any one of examples 22 to 25, above.

Patch 140 supports formable coupler 116 relative to insulating portion 112 and, in some examples, enables attachment of formable coupler 116 to insulating portion 112 during installation of blanket 110. For example, blanket 110 includes multiple patches, providing for multiple coupler installation location options. An installer determines where formable couplers are needed and places formable couplers into corresponding pockets.

In some examples, patch 140 is made from the same material as insulating portion 112 or as tab portion 114. For example, a part of insulating portion 112 is folded over and used as patch 140. Furthermore, various attachments types (of patch 140 to insulating portion 112) are contemplated herein. In some examples, patch 140 is non-removably attached to insulating portion 112.

Referring generally to FIG. 1 and particularly to, e.g., FIGS. 3D-3H for illustrative purposes only and not by way of limitation, patch 140 is attached to insulating portion 112 so that pocket 142 is a blind pocket, having open end 146 that is defined by discrete portion 147 of peripheral edge 144 of patch 140. Discrete portion 147 of peripheral edge 144 is not attached to insulating portion 112. The preceding portion of this paragraph characterizes example 33 of the subject matter, disclosed herein, where example 33 also encompasses example 32, above.

Open end 146 of pocket 142 enables attachment of formable coupler 116 to insulating portion 112 during or prior to installation of blanket 110 on aircraft structure 190. Furthermore, open end 146 of pocket 142 enables detachment of formable coupler 116 from insulating portion 112, e.g., by removing formable coupler 116 from pocket 142. For example, formable coupler 116 is needed in a different location along first edge 111 and needs to be reinstalled.

For purposes of this disclosure, a blind pocket is defined as a pocket with open end 146, while other parts of the pocket are closed. Open end 146 enables installation and removal of formable coupler 116, through open end 146, while other attached parts retain formable coupler 116 within pocket 142.

Referring generally to FIG. 1 and particularly to, e.g., FIGS. 3G-3I for illustrative purposes only and not by way of limitation, insulating portion 112 comprises first edge 111 and second edge 113, perpendicular to first edge 111. Open end 146 of pocket 142 faces away from first edge 111 of insulating portion 112. The preceding portion of this paragraph characterizes example 34 of the subject matter, disclosed herein, where example 34 also encompasses example 33, above.

The orientation of open end 146 of pocket 142 indicates the direction for installation of formable coupler 116 to pocket 142 and removal of formable coupler 116 from pocket 142. When open end 146 of pocket 142 faces away from first edge 111 of insulating portion 112, formable coupler 116 is removed from pocket 142 by sliding formable coupler 116, relative to insulating portion 112 and to pocket 142, away from first edge 111. In some examples, after installation of blanket 110 on aircraft structure 190, blanket 110 is at a tension, being pulled in a direction away from first edge 111 and toward open end 146 of pocket 142. It should be noted that formable coupler 116 supports blanket 110 relative to aircraft structure 190, and resists this tension. The orientation of open end 146 of pocket 142 prevents formable coupler 116 from sliding out of pocket 142 when blanket 110 is in tension. In fact, this tension pushes formable coupler 116 deeper into pocket 142.

In some example, open end 146 of pocket 142 or, more specifically, discrete portion 147 of peripheral edge 144 of patch 140, which defines open end 146 of pocket 142, is parallel to first edge 111.

Referring generally to FIG. 1 and particularly to, e.g., FIG. 3G for illustrative purposes only and not by way of limitation, formable coupler 116 is inserted into pocket 142 such that patch 140 overlaps all of formable coupler 116 and formable coupler 116 is spaced away from discrete portion 147 of peripheral edge 144. The preceding portion of this paragraph characterizes example 35 of the subject matter, disclosed herein, where example 35 also encompasses example 33 or 34, above.

Fully inserting formable coupler 116 into pocket 142 helps to isolate formable coupler 116 from the environment, e.g., to prevent moisture condensation on formable coupler 116, corrosion of formable coupler 116, and the like. When formable coupler 116 is inserted into pocket 142 such that patch 140 overlaps all of formable coupler 116 and formable coupler 116 is spaced away from discrete portion 147 of peripheral edge 144, formable coupler 116 is fully inserted into pocket 142. In these examples, formable coupler 116 does not extend out of pocket 142.

Referring generally to FIG. 1 and particularly to, e.g., FIGS. 3E-3I for illustrative purposes only and not by way of limitation, patch 140 is attached to insulating portion 112 with stitching 154. The preceding portion of this paragraph characterizes example 36 of the subject matter, disclosed herein, where example 36 also encompasses any one of examples 32 to 35, above.

Stitching 154 supports patch 140 relative to insulation portion 112 while adding only minimal weight to the overall structure. Unlike surface adhesive, stitching 154 protrudes into the body of patch 140 and the body of insulating portion 112 thereby ensuring robust attachment. Various examples of stitching 154, such as running stitching, basting stitching, cross stitching, backstitching, slip stitching, standard forward/backward stitching, and zigzag stitching, are contemplated herein.

Referring generally to FIG. 1 and particularly to, e.g., FIG. 3I for illustrative purposes only and not by way of limitation, stitching 154 circumferentially encloses formable coupler 116. The preceding portion of this paragraph characterizes example 37 of the subject matter, disclosed herein, where example 37 also encompasses example 36, above.

When stitching 154 circumferentially encloses formable coupler 116, stitching 154 keeps formable coupler inside pocket 142 and prevents sliding from pocket 142 when, e.g., blanket 110 is placed under tension during installation of blanket 110. This circumferentially enclosing feature also ensures that formable coupler 116 does not accidently slips out of pocket 142 during transportation, handling, and installation of blanket 110.

In some examples, stitching 154, which circumferentially encloses formable coupler 116, is formed during fabrication of blanket 110. As such, formable coupler 116 is permanently fixed on blanket 110 during this process.

Referring generally to FIG. 1 and particularly to, e.g., FIGS. 3E-3H for illustrative purposes only and not by way of limitation, patch 140 is attached to insulating portion 112 with stitching 154 that is not circumferentially closed. The preceding portion of this paragraph characterizes example 38 of the subject matter, disclosed herein, where example 38 also encompasses example 36, above.

Stitching 154 that is not circumferentially closed enables attachment of formable coupler 116 to insulating portion 112 during or prior to installation of blanket 110 on aircraft structure 190. Furthermore, stitching 154 that is not circumferentially closed enables detachment of formable coupler 116 from insulating portion 112, e.g., by removing formable coupler 116 from pocket 142. For example, formable coupler 116 is needed in a different location along first edge 111 and needs to be reinstalled.

In some examples, stitching 154, which is not circumferentially closed, creates open end 146, which is defined by discrete portion 147 of peripheral edge 144 of patch 140. Discrete portion 147 of peripheral edge 144 is not attached to insulating portion 112.

Referring generally to FIG. 1 and particularly to, e.g., FIG. 3E for illustrative purposes only and not by way of limitation, insulating portion 112 comprises first edge 111 and second edge 113, perpendicular to first edge 111. Peripheral edge 144 of patch 140 comprises discrete portion 147. Pocket 142 is a through pocket, comprising open end 146, defined by discrete portion 147, which is not attached to insulating portion 112. Pocket 142 also comprises second open end 143, which is not attached to insulating portion 112 and is offset, relative to open end 146, along line 103, perpendicular to first edge 111 of insulating portion 112, to open end 146, and to second open end 143. Second open end 143 of pocket 142 is closer to first edge 111 of insulating portion 112 than open end 146. The preceding portion of this paragraph characterizes example 39 of the subject matter, disclosed herein, where example 39 also encompasses example 32, above.

A through pocket enables attachment of formable coupler 116 to insulating portion 112 during or prior to installation of blanket 110 on aircraft structure 190. Furthermore, the through pocket enables detachment of formable coupler 116 from insulating portion 112, e.g., by removing formable coupler 116 from pocket 142. For example, formable coupler 116 is needed in a different location along first edge 111 and needs to be reinstalled. This installation and removal can be performed from different ends of pocket 142, e.g., open end 146 and second open end 143.

In some examples, a though pocket is formed by attaching two portions of peripheral edge 144, extending between two non-attached discrete portions.

Referring generally to FIG. 1 and particularly to, e.g., FIGS. 3D-3F for illustrative purposes only and not by way of limitation, formable coupler 116 extends out of pocket 142 from open end 146 of pocket 142. The preceding portion of this paragraph characterizes example 40 of the subject matter, disclosed herein, where example 40 also encompasses example 39, above.

When formable coupler 116 extends out of pocket 142, formable coupler 116 can be easily removed (e.g., pulled) from pocket 142. For example, an installer decides that formable coupler 116 is not needed at a particular location. In some examples, formable coupler 116 extends out of pocket 142 by at least 1 millimeter or, more specifically, at least 3 millimeters.

Referring generally to FIG. 1 and particularly to, e.g., FIGS. 3D, 3E, and 4D for illustrative purposes only and not by way of limitation, one end of formable coupler 116 comprises catch 153 that hooks over discrete portion 147 of peripheral edge 144. The preceding portion of this paragraph characterizes example 41 of the subject matter, disclosed herein, where example 41 also encompasses example 39 or 40, above.

Catch 153 keeps formable coupler 116 in pocket 142 and prevents formable coupler 116 from sliding out of pocket 142 when, e.g., blanket 110 is placed under tension during installation of blanket 110. Furthermore, in some examples, catch 153 is configured to engage a part of aircraft structure 190 as, e.g., is shown in FIG. 4D thereby providing additional support to blanket 110 on aircraft structure 190.

In some examples, catch 153 is formed by folding over a part of formable coupler 116 over discrete portion 147 of peripheral edge 144, e.g., using stamping or other suitable process. In some examples, the size of catch 153 is between 0.5 millimeters and 5 millimeters or, more specifically, between 1 millimeter and 3 millimeters.

Referring generally to FIG. 1 and particularly to, e.g., FIG. 3F for illustrative purposes only and not by way of limitation, one end of formable coupler 116 comprises enlarged portion 155, which is wider than open end 146 of pocket 142. The preceding portion of this paragraph characterizes example 42 of the subject matter, disclosed herein, where example 42 also encompasses example 39 or 40, above.

Enlarged portion 155 keeps formable coupler 116 in pocket 142 and prevents formable coupler 116 from sliding out of pocket 142 when, e.g., blanket 110 is placed under tension during installation of blanket 110. More specifically, enlarged portion 155 is wider than pocket 142. In some examples, enlarged portion 155 is at least 10% or even at least 20% wider than the remaining portion of formable coupler 116. It should be noted that this remaining portion of formable coupler 116 is narrower than pocket 142 and extends into pocket 142.

Referring generally to FIG. 1 and particularly to, e.g., FIGS. 3D-3F for illustrative purposes only and not by way of limitation, a portion of formable coupler 116 extends from pocket 142. The preceding portion of this paragraph characterizes example 43 of the subject matter, disclosed herein, where example 43 also encompasses any one of examples 32 to 36, 38, and 39, above.

When formable coupler 116 extends out of pocket 142, formable coupler 116 can be easily removed (e.g., pulled) from pocket 142. For example, an installer decides that formable coupler 116 is not needed at a particular location. In some examples, formable coupler 116 extends out of pocket 142 by at least 1 millimeter or, more specifically, at least 3 millimeters.

Examples of the subject matter, disclosed herein may be described in the context of aircraft manufacturing and service method 900 as shown in FIG. 5 and aircraft 902 as shown in FIG. 6. During pre-production, illustrative method 900 may include specification and design (block 904) of aircraft 902 and material procurement (block 906). During production, component and subassembly manufacturing (block 908) and system integration (block 910) of aircraft 902 may take place. Thereafter, aircraft 902 may go through certification and delivery (block 912) to be placed in service (block 914). While in service, aircraft 902 may be scheduled for routine maintenance and service (block 916). Routine maintenance and service may include modification, reconfiguration, refurbishment, etc. of one or more systems of aircraft 902.

Each of the processes of illustrative method 900 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 6, aircraft 902 produced by illustrative method 900 may include airframe 918 with a plurality of high-level systems 920 and interior 922. Examples of high-level systems 920 include one or more of propulsion system 924, electrical system 926, hydraulic system 928, and environmental system 930. Any number of other systems may be included. Although an aerospace example is shown, the principles disclosed herein may be applied to other industries, such as the automotive industry. Accordingly, in addition to aircraft 902, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 900. For example, components or subassemblies corresponding to component and subassembly manufacturing (block 908 may be fabricated or manufactured in a manner similar to components or subassemblies produced while aircraft 902 is in service (block 914). Also, one or more examples of the apparatus(es), method(s), or combination thereof may be utilized during production stages 908 and 910, for example, by substantially expediting assembly of or reducing the cost of aircraft 902. Similarly, one or more examples of the apparatus or method realizations, or a combination thereof, may be utilized, for example and without limitation, while aircraft 902 is in service (block 914) and/or during maintenance and service (block 916).

Different examples of the apparatus(es) and method(s) disclosed herein include a variety of components, features, and functionalities. It should be understood that the various examples of the apparatus(es) and method(s), disclosed herein, may include any of the components, features, and functionalities of any of the other examples of the apparatus(es) and method(s) disclosed herein in any combination.

Many modifications of examples, set forth herein, will come to mind of one skilled in the art, having the benefit of the teachings, presented in the foregoing descriptions and the associated drawings.

Therefore, it is to be understood that the subject matter, disclosed herein, is not to be limited to the specific examples illustrated and that modifications and other examples are intended to be included within the scope of the appended claims. Moreover, although the foregoing description and the associated drawings describe examples of the subject matter, disclosed herein, in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided herein.

What is claimed is:

1. A blanket for insulating an aircraft structure, the blanket comprising:
    an insulating portion, comprising a first edge and a second edge, perpendicular to the first edge;
    a tab portion, extending from the insulating portion; and
    a formable coupler, attached to the insulating portion;
    wherein:
        the tab portion is thinner than the insulating portion;
        the insulating portion fully overlaps the formable coupler; and
        the formable coupler is parallel to the second edge of the insulating portion and is perpendicular to the first edge of the insulating portion.

2. The blanket according to claim 1, wherein the formable coupler is attached to the insulating portion with an adhesive layer, located between the insulating portion and the formable coupler.

3. The blanket according to claim 1, wherein the formable coupler is attached to the insulating portion with an adhesive tape, overlapping at least a portion of the formable coupler and a portion of the insulating portion.

4. The blanket according to claim 3, wherein the adhesive tape overlaps all of the formable coupler.

5. The blanket according to claim 1, wherein the formable coupler is attached to the insulating portion with a hook-and/or loop-type fastener.

6. The blanket according to claim 5, wherein the hook-and/or loop-type fastener overlaps at least a portion of the formable coupler and a portion of the insulating portion.

7. The blanket according to claim 1, wherein the formable coupler is spaced away from the first edge of the insulating portion.

8. The blanket according to claim 1, further comprising a patch, attached to the insulating portion so that a pocket is formed between the patch and the insulating portion, wherein the patch comprises a peripheral edge.

9. The blanket according to claim 8, wherein:
    the patch is attached to the insulating portion so that the pocket is a blind pocket, having an open end that is defined by a discrete portion of the peripheral edge of the patch; and
    the discrete portion of the peripheral edge is not attached to the insulating portion.

10. The blanket according to claim 9, wherein the open end of the pocket faces away from the first edge of the insulating portion.

11. The blanket according to claim 9, wherein the formable coupler is inserted into the pocket such that the patch overlaps all of the formable coupler and the formable coupler is spaced away from the discrete portion of the peripheral edge.

12. The blanket according to claim 8, wherein the patch is attached to the insulating portion with stitching.

13. The blanket according to claim 12, wherein the stitching circumferentially encloses the formable coupler.

14. The blanket according to claim 12, wherein the patch is attached to the insulating portion with stitching that is not circumferentially closed.

15. The blanket according to claim 8, wherein:
    the peripheral edge of the patch comprises a discrete portion;
    the pocket is a through pocket, comprising:
        an open end, defined by the discrete portion, which is not attached to the insulating portion; and
        a second open end, which is not attached to the insulating portion and is offset, relative to the open end, along a line perpendicular to the first edge of the insulating portion, to the open end, and to the second open end; and
    the second open end of the pocket is closer to the first edge of the insulating portion than the open end.

16. The blanket according to claim 15, wherein the formable coupler extends out of the pocket from the open end of the pocket.

17. The blanket according to claim 15, wherein one end of the formable coupler comprises a catch that hooks over the discrete portion of the peripheral edge.

18. The blanket according to claim 15, wherein one end of the formable coupler comprises an enlarged portion, which is wider than the open end of the pocket.

19. The blanket according to claim 8, wherein a portion of the formable coupler extends from the pocket.

20. An insulated aircraft assembly, comprising:
    an aircraft structure;
    the blanket of claim 1.

* * * * *